United States Patent
Brizzi et al.

(10) Patent No.: US 12,429,340 B2
(45) Date of Patent: Sep. 30, 2025

(54) SYSTEMS AND METHODS FOR DERIVING PATH-PRIOR DATA USING COLLECTED TRAJECTORIES

(71) Applicant: Lyft, Inc., San Francisco, CA (US)

(72) Inventors: Filippo Brizzi, London (GB); Lorenzo Peppoloni, London (GB)

(73) Assignee: Lyft, Inc., San Francisco, CA (US)

( * ) Notice: Subject to any disclaimer, the term of this patent is extended or adjusted under 35 U.S.C. 154(b) by 829 days.

(21) Appl. No.: 16/900,685

(22) Filed: Jun. 12, 2020

(65) Prior Publication Data
US 2021/0389133 A1    Dec. 16, 2021

(51) Int. Cl.
*G01C 21/30*    (2006.01)
*G05D 1/00*    (2024.01)

(52) U.S. Cl.
CPC .......... *G01C 21/30* (2013.01); *G05D 1/0212* (2013.01)

(58) Field of Classification Search
CPC .. G01C 21/30; G01C 21/3807; G05D 1/0212; G05D 2201/0213; B60W 60/0011
See application file for complete search history.

(56) References Cited

U.S. PATENT DOCUMENTS

| 2018/0099667 A1* | 4/2018 | Abe ................. B60W 30/0956 |
| 2018/0348761 A1* | 12/2018 | Zhu ........................ G08G 1/167 |
| 2020/0122721 A1* | 4/2020 | Zhang ............. B60W 60/00272 |

\* cited by examiner

*Primary Examiner* — Thomas E Worden
*Assistant Examiner* — Elizabeth Rose Neleski
(74) *Attorney, Agent, or Firm* — Lee Sullivan Shea & Smith LLP

(57) ABSTRACT

Examples disclosed herein may involve a computing system that is configured to (i) identify a set of trajectories traveled through a path within an area, (ii) for each of two or more sampling positions along the path, (a) determine a respective set of intersection points between the identified set of trajectories and the sampling position and (b) generate a respective aggregation of the respective set of intersection points, and (iii) based on the generated aggregations for the two or more sampling positions along the path, derive a path-prior dataset for the path.

20 Claims, 11 Drawing Sheets

SYSTEMS AND METHODS FOR DERIVING PATH-PRIOR DATA USING COLLECTED TRAJECTORIES

BACKGROUND

Vehicles are increasingly being equipped with technology that enables them to monitor their surrounding environment and perform certain tasks with little or no human input, as appropriate. For instance, vehicles may be equipped with (i) sensors that are configured to capture various types of sensor data that is representative of the vehicle's surrounding environment, (ii) an on-board computing system that is configured to perform functions such as perception of the vehicle's surrounding environment (including object detection), prediction of future object behavior, and planning of the vehicle's future behavior, and (iii) actuators that are configured to control the physical behavior of the vehicle, among other possibilities.

SUMMARY

In one aspect, the disclosed technology may take the form of a method that involves (i) identifying a set of trajectories traveled through a path within an area, (ii) for each of two or more sampling positions along the path, (a) determining a respective set of intersection points between the identified set of trajectories and the sampling position and (b) generating a respective aggregation of the respective set of intersection points, and (iii) based on the generated aggregations for the two or more sampling positions along the path, deriving a path-prior dataset for the path.

In example embodiments, the method may additionally involve, before identifying the set of trajectories that are traveled through the path within the area, (i) obtaining sensor data captured by one or more sensor-equipped vehicles while traveling in the area, and (ii) generating a plurality of trajectories from the sensor data that was captured. In these example embodiments, identifying the set of trajectories traveled through the path within the area may involve identifying the set of trajectories from the generated plurality of trajectories. Further in these example embodiments, the sensor data captured by the one or more sensor-equipped vehicles while operating in the area may be one or more of image data, Inertial Measurement Unit (IMU) data, or Global Positioning System (GPS) data.

Further, in example embodiments, the path within the area may include a given lane within the area. In these example embodiments, identifying the set of trajectories from the generated plurality of trajectories traveled through the given lane may involve (i) accessing map data that defines geospatial information for the given lane within the area (ii) comparing the map data that defines the geospatial information for the given lane to the generated plurality of trajectories, and (iii) based on this comparing, identifying the set of trajectories to include one or more of the generated plurality of trajectories that have traversed the given lane.

Further, in example embodiments, determining the respective set of intersection points between the identified set of trajectories and the sampling position may involve (i) identifying a sequence of contiguous segments that represent the path, wherein each respective pair of two consecutive segments in the sequence defines a respective segment border within the path, and (ii) determining a respective set of intersection points between the identified set of trajectories and the respective segment border. In these example embodiments, identifying the sequence of contiguous segments that represent the path may involve (i) determining a number of desired contiguous segments to represent the path, (ii) dividing the path by the number of desired contiguous segments, and (iii) identifying pairs of segment points at each respective segment border within the path.

Still further, in example embodiments, generating the respective aggregation (e.g., statistical aggregation) of the respective set of intersection points for each of two or more sampling positions along the path may take various forms. For instance, as one possibility, this function may involve, for each of the two or more sampling positions along the path, aggregating the respective set of intersection points together to produce an aggregated intersection point. As another possibility, this function may involve, for each of the two or more sampling positions along the path, generating a respective distribution that is representative of the respective set of intersection points. As yet another possibility, this function may involve, for each of the two or more sampling positions along the path, ignoring any point in the respective set of intersection points that is outside a boundary of the path. As still another possibility, this function may involve, for each of the two or more sampling positions along the path, applying a weight to each intersection point in the respective set of intersection points, where the applied weight is based on a distance of each intersection point to a center point of the path. Generating the respective aggregation of the respective set of intersection points for each of two or more sampling positions along the path may take other forms as well.

Still further, in example embodiments, where generating the aggregation of the respective set of intersection points for each of two or more sampling positions along the path involves, for each of the two or more sampling positions along the path, aggregating the respective set of intersection points together to produce an aggregated intersection point, deriving the path-prior dataset for the path may take various forms. For instance, as one possibility, this function may involve (i) inputting the aggregated intersection points produced for each of the two or more sampling positions into a motion model that functions to output a smoothed version of the aggregated intersection points, and (ii) defining the output of the motion model as the path-prior dataset for the path. As another possibility, this function may involve compiling the aggregated intersection points produced for each of the two or more sampling positions into a set of aggregated intersection points that defines the path-prior dataset for the path. Deriving the path-prior dataset for the path when generating the respective aggregation of the respective set of intersection points for each of two or more sampling positions along the path involves, for each of the two or more sampling positions along the path, aggregating the respective set of intersection points together to produce an aggregated intersection point may take other forms as well.

Still further, in example embodiments, where generating the respective aggregation of the respective set of intersection points for each of two or more sampling positions along the path involves, for each of the two or more sampling positions along the path, generating a respective distribution that is representative of the respective set of intersection points, deriving the path-prior dataset for the path may involve encoding the distribution into the path-prior dataset for the path.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1:
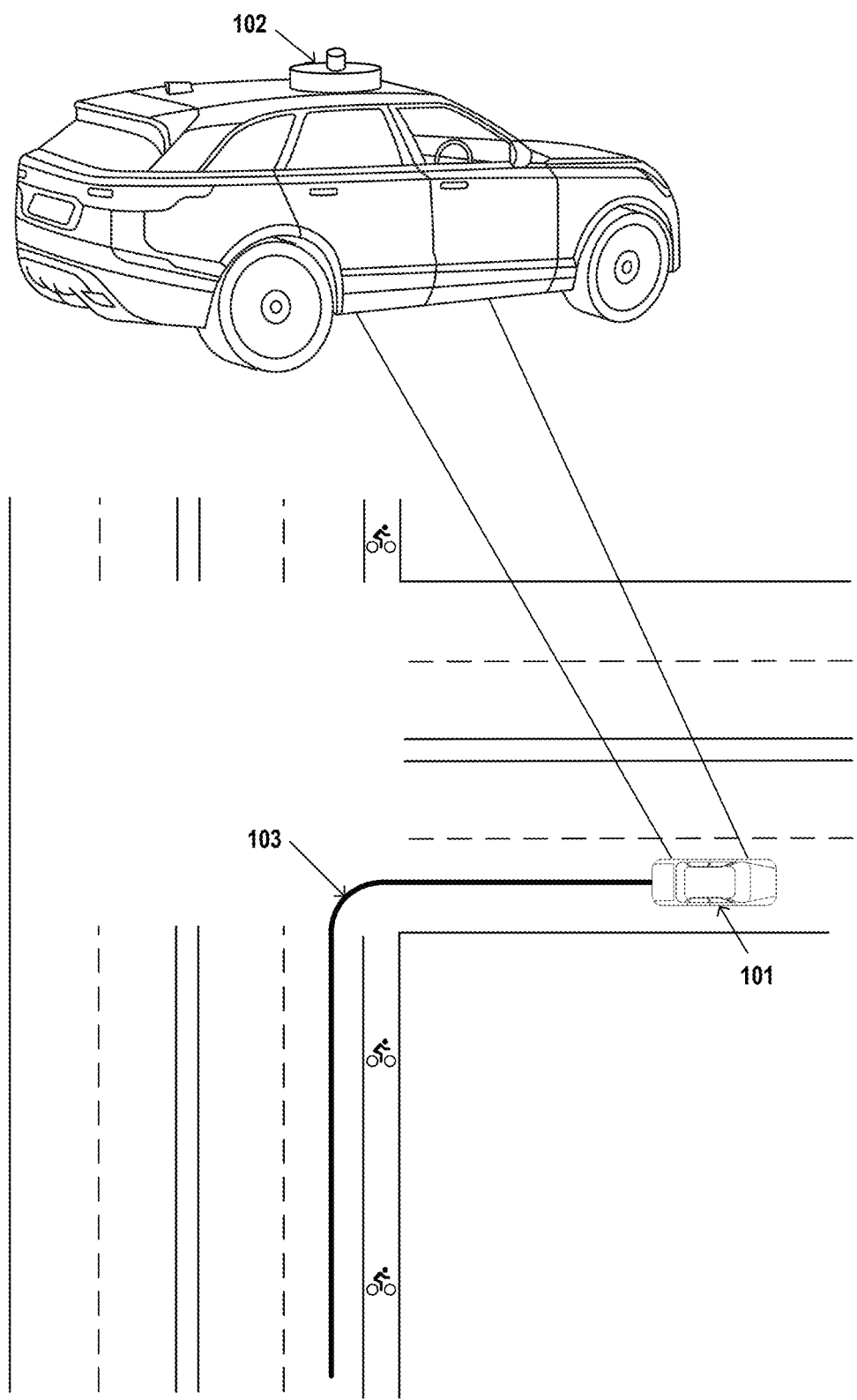
FIG. 1 is a diagram that illustrates one example of a path prior that may be collected by one type of sensor system.

Information regarding the prior behavior of vehicles or other types of agents within the real world can be used in various areas of technology to help improve operation. One specific example of this information is prior trajectories for vehicles or other types of agents in the real world, which can be used to help facilitate and improve various aspects of technology. (As used herein, a prior "trajectory" for an agent generally refers to a representation of the agent's motion and location within the real world over the course of some period of time, which may take the form of a time-sequence of position, orientation, velocity, and/or acceleration values for the agent, among other possibilities).

For instance, as one possibility, prior trajectories for vehicles or other types of agents in the real world could be used by on-board computing systems of vehicles (e.g., vehicles equipped with autonomy systems and/or advanced driver assistance systems) to perform various operations.

One such operation may involve planning the future behavior of a vehicle, which generally involves deriving a behavior plan for the vehicle that defines the desired driving behavior of the vehicle for some future period of time (e.g., the next 5 seconds)—including the planned trajectory of the vehicle for that future period of time. For example, to the extent that a vehicle's on-board computing system has access to prior vehicle trajectories for the road on which the vehicle is currently traveling, the vehicle's on-board computing system may use those prior vehicle trajectories during planning in order to derive a planned trajectory for the vehicle that is informed by how other vehicles have historically traversed that same road. Advantageously, using prior trajectories of vehicles in this manner may enable a vehicle's on-board computing system to plan future behavior of the vehicle that is more naturalistic than behavior that is planned based on geometric and/or semantic map data alone.

Another such operation may involve predicting the future behavior of agents surrounding a vehicle. For example, to the extent that a vehicle's on-board computing system has access to prior agent trajectories for the road on which the vehicle is currently traveling, the vehicle's on-board computing system may use those prior agent trajectories to help predict the future behavior of agents surrounding the vehicle, and this predicted behavior of the surrounding agents may then be used to inform the on-board computing system's planning of the vehicle's behavior.

On-board computing systems of vehicles may use prior agent trajectories to help facilitate other operations as well.

As another possibility, prior agent trajectories for a given area could be used by a transportation-matching platform (e.g., a platform that is configured to match individuals interested in obtaining transportation with vehicles capable of providing such transportation) to perform various different operations, including but not limited to matching individuals with available vehicles within the given area, generating the most optimal routes for vehicles to follow when picking up and/or transporting individuals within the given area, providing accurate estimates of pickup and drop-off times within the given area, and/or effectively pre-positioning vehicles within the given area in anticipation of responding to transportation requests, among other possibilities.

As yet another possibility, prior agent trajectories for a given area could be used by a computing system to identify and generate data characterizing past occurrences of certain scenario types of interest within the given area, examples of which may include a "cut-in" scenario where another agent cuts in front of a vehicle, an "unprotected left" scenario where a vehicle makes an unprotected left turn at an intersection, and a "pedestrian ahead" scenario where a pedestrian is in an vehicle's field of view, and such data could then be used for purposes—including but not limited to encoding such data into a map for the given area and/or using such data to train machine learning models that may be used by a vehicle's on-board system to predict which scenario types of interest (if any) are being perceived by the vehicle.

However, it will be appreciated that an extensive and diverse set of prior agent trajectories will generally need to be collected before the functionality described above can be achieved at scale. Indeed, before prior agent trajectories can be used to perform the operations described above within any given geographic area, prior agent trajectories may need to be collected for nearly every road that could potentially be traversed by an vehicle within the given geographic area—and for many roads, multiple trajectories may need to be collected in order to account for the fact that vehicles may traverse such roads different ways due to various factors—including road features such as multiple lanes, intersections, forks, or the like, differences in the times when the roads were traversed, and differences in the conditions under which the roads were traversed (e.g., weather, traffic, depending on dynamic agent behavior, etc.). And this task would then need to be repeated for every geographic area in which there is a desire to leverage prior agent trajectories to achieve the benefits described above. As such, there is a need for approaches that allow prior agent trajectories to be collected in a way that is both accurate and scalable.

In this respect, one possible approach for collecting prior trajectories may make use of sensor data captured by the types of expensive, 360° sensor systems that are commonly found on autonomous vehicles, which are typically comprised of a Light Detection and Ranging (LiDAR) unit combined with a 360°-camera array and telematics sensors. As a vehicles equipped with such a 360° sensor system is being driven (typically by humans, but perhaps also with some level of autonomous operation), the vehicle's 360° sensor system captures high-fidelity sensor data that is indicative of the movement and location of the vehicle and perhaps other agents surrounding the vehicle within the given area. In turn, processing may then be applied to this high-fidelity sensor data in order to derive trajectory information for the vehicle and perhaps also the other surrounding agents.

Beneficially, the trajectories that are collected in this manner typically have a very high level of accuracy. Further, these vehicles are often driven in accordance with a set of "guidelines" for how a vehicle is supposed to autonomously operate while in a real-world environment, which means that the trajectories collected in this manner are generally reflective of how a vehicle is supposed to autonomously operate when in that same real-world environment.

However, there are only a limited number of vehicles in the world that are equipped with 360° sensor systems and capable of collecting trajectories in this manner. In this respect, it is neither practical nor realistic to collect trajectories for the full universe of real-world roads using these types of expensive, 360° sensor systems. For instance, there are more geographic areas of interest than there are vehicles equipped with 360° sensor systems available to collect trajectories for all of the real-world roads in each of these geographic areas. Thus, with the limited number of such vehicles available, it would be time prohibitive for these vehicles to (i) traverse a given geographic area, (ii) transport the vehicle to another geographic area, and (iii) begin traversing another set of real-world roads in that other geographic area.

Further, increasing the number of vehicles equipped with 360° sensor systems in order to collect trajectories for the full universe of real-world roads would also neither be practical nor realistic due to the cost of, and time required to, manufacture the necessary number of vehicles equipped with the types of expensive 360° sensor systems described above. Thus, it would be cost and time prohibitive to produce a number of vehicles required to collect trajectories for the full universe of real-world roads.

One possible example of a trajectory collected by a 360° sensor system of a vehicle is depicted in FIG. 1. In particular, FIG. 1 illustrates a top-down view of a portion of a geographic area comprising two roads that intersect with one another. On the geographic area, a vehicle 101 is shown, as well as a trajectory 103. The vehicle 101 may be human-driven and, as shown in the blown-out view of the vehicle 101, the vehicle 101 may be equipped with a 360° sensor system 102 that includes sensors such as a multiple-camera array and/or a LIDAR unit. The trajectory 103 may take the form of a time sequence of position and orientation value, among other possibilities.

As discussed briefly above, the trajectory 103 may be reflective of how a vehicle is supposed to autonomously operate in the geographic area. For instance, there may be certain guidelines that a vehicle is expected to follow while operating autonomously, examples of which may include making gradual turns, obeying the rules of the road, and not traversing bicycle or pedestrian paths. In this respect, a human driver of the vehicle 101 may drive in a manner that is in line with these guidelines while 360° sensor system 102 gathers sensor data that can be used to generate the trajectory 103. The trajectories that are collected in this manner can then be used in the any of the various manners described above (e.g., for purposes of planning a vehicle's behavior). However, as discussed above, collecting trajectories in this manner for every real-world road in the world is impractical and unrealistic.

One potential way to combat the cost and scalability problems associated with collecting trajectories using expensive, 360° sensor systems is to collect trajectories using other types of sensor systems that are less expensive and more prevalent than the 360° sensor systems. In general, these other types of sensor systems may generally comprise any system of one or more sensors, embodied in any form, that is capable of capturing sensor data and/or other localization information from which a trajectory having a given level of accuracy (e.g., lane-level accuracy) can be derived. One possible example of such a sensor system may take the form of a camera-based sensor system that is comprised of a monocular and/or stereo camera along with telematics sensors, which may be the embodied within a device such as a smartphone, a tablet, a dashcam, or the like that can be placed somewhere within a vehicle (e.g., by being mounted on a dashboard or windshield of a vehicle). Another possible example of such a sensor system may take the form of telematics-only sensor system comprised primarily of telematics sensors such as an Inertial Measurement Unit (IMU) and/or a Global Positioning System (GPS) unit, which may be embodied in a device such as a smartphone, a tablet, a navigation unit, or the like that can be placed somewhere within a vehicle (e.g., by being mounted on a dashboard or windshield of a vehicle, being placed in a cupholder or tray within the center console, or simply being in the pocket of a driver or passenger within the vehicle). Other examples of sensor systems capable of capturing sensor data from which trajectory information can be derived are possible as well, including the possibility that such a sensor system may be embodied within a device that is co-located with another type of agent such as a bicyclist or pedestrian as opposed to a vehicle (e.g., a smartphone of a bicyclist or a pedestrian).

As with 360° sensor systems, collecting agent trajectories using another type of sensor system associated with a vehicle may generally involve capturing sensor data that is indicative of the movement and location of the vehicle (and perhaps other agents surrounding the vehicle) in the real world, such as image data, IMU data, and/or GPS data among other possibilities, and then applying processing (e.g., localization techniques) to this captured sensor data in order to derive trajectory information for the vehicle (and perhaps also the other surrounding agents). Beneficially, collecting trajectories using these other types of sensor systems may enable prior agent trajectories to be collected on a much larger scale than an approach that relies on expensive 360° sensor systems. Moreover, while prior agent trajectories collected using these other types of sensor systems are unlikely to be as accurate as those collected using 360° sensor systems given the differences in sensor fidelity, it may still be possible to use such prior agent trajectories to help carry out the functionality discussed above—particularly if these other types of sensor systems enable a large enough volume of prior agent trajectories to be collected.

However, collecting trajectories using these other types of sensor systems may present its own set of challenges. As one example, the vehicles with which these types of sensor systems are associated may engage in driving behavior that is not necessarily suitable for autonomous operation of a vehicle, such as driving erratically (e.g., not within a lane), taking turns too sharply, and/or ignoring rules of the road (e.g., entering a bike lane when turning). As another example, there may be a wide variance in how different vehicles with which these types of sensor systems are associated traverse the same real-world road, which presents challenges in terms of how to transform all of these different trajectories into a path-prior dataset that is actually usable to carry out the functionality described above.

Figure 2:
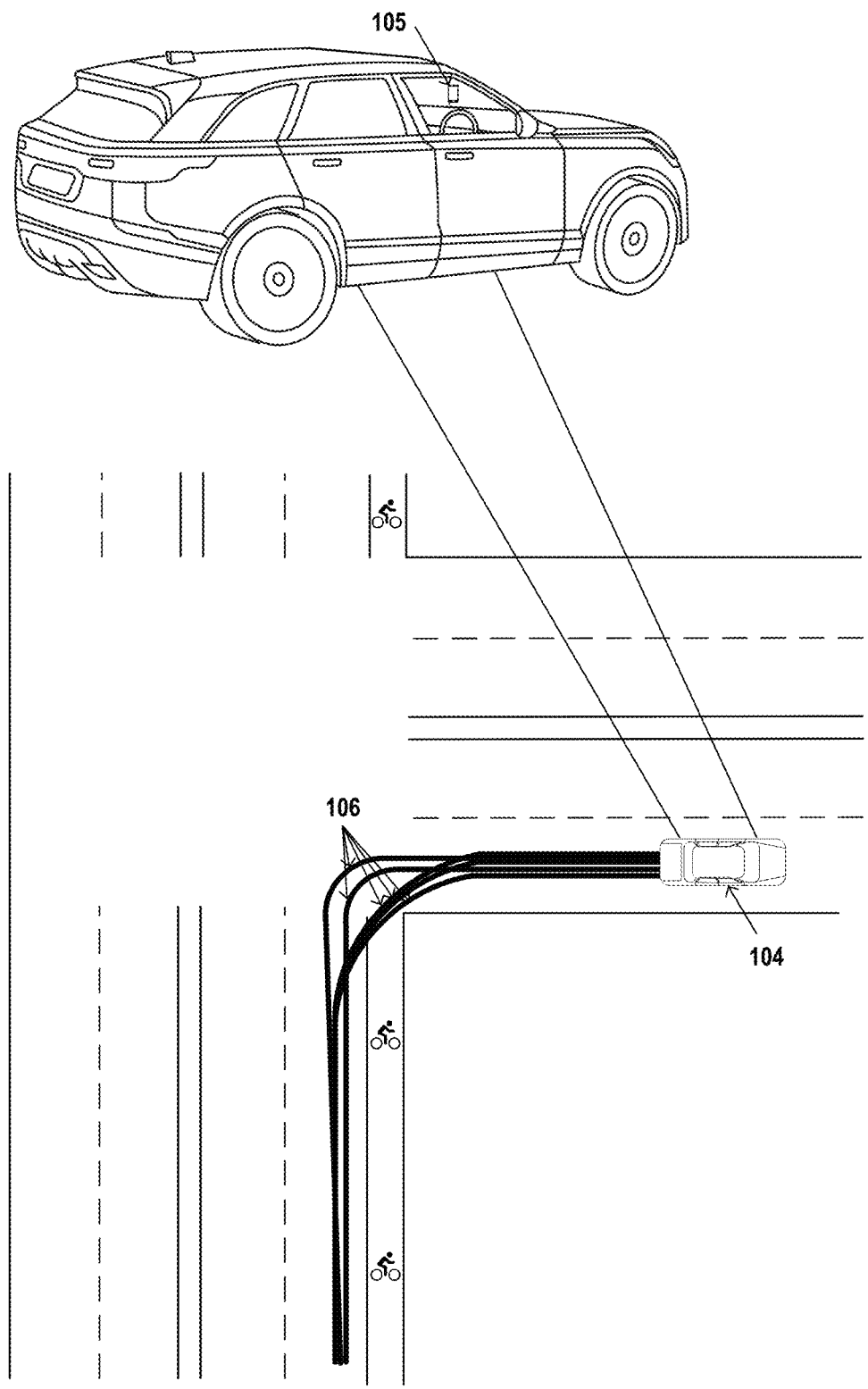
FIG. 2 is a diagram that illustrates one example of a plurality of trajectories generated from sensor data collected by other types of sensor systems.

An illustration of these potential challenges that may arise when collecting trajectories using these other types of sensor systems is depicted in FIG. 2, which illustrates a top-down view of the same geographic area depicted in FIG. 1. However, in contrast to the one trajectory that was generated using the data captured by 360° sensor system 102 of vehicle 101, FIG. 2 shows that a plurality of trajectories 106 have been collected using other types of sensor systems, such as a camera-based sensor system 105 that is co-located with a vehicle 104. In this respect, camera-based sensor system 105 may be embodied in any type of device that houses, or has the capability of housing, a monocular camera and telematics sensors (e.g., a smart phone, a tablet, a dash cam, etc.).

In line with the discussion above, as vehicle 104 traverses the geographic area, camera-based sensor system 105 may capture sensor data that is indicative of the movement and location of vehicle 104 and perhaps other agents surrounding vehicle 104 in the geographic area, where this sensor data may take the form of image data, IMU data, and/or GPS data, among various other possibilities. In turn, processing (e.g., localization techniques) may be applied to this captured sensor data in order to derive trajectory information for vehicle 104 and perhaps also other agents surrounding vehicle 104 in the geographic area.

As shown in FIG. 2, one issue presented by using this approach to collect trajectories is that the vehicles with which these other types of sensor systems are associated can exhibit driving behavior that is not consistent with how a vehicle should drive when operating autonomously. For example, as shown, some of the trajectories 106 collected in this manner (i) cut into the bike lane that borders the right of the real-world road or (ii) make the turn too sharply. As previously discussed, these trajectories 106 do not represent acceptable autonomous driving behavior. In contrast, others of the trajectories 106 do represent what would generally be considered acceptable autonomous driving behavior, as they stay within the path and feature a gradual right turn.

Also shown in FIG. 2, another issue presented by using these other types of sensor systems is the variance between the trajectories 106, which may make it difficult to use these trajectories to carry out the functionality described above. For instance, the trajectories 106 represent a wide array of driving behaviors when taking the same right turn in the illustrated geographic area. Given this wide array of driving behaviors, it may be difficult for a vehicle's on-board computing system to take all of these different trajectories 106 and use them to derive a planned trajectory for a vehicle that is suitable for the autonomous operation (among other possible issues).

To address these and other issues, disclosed herein is a technique for deriving a "path-prior dataset" for a path within an area (e.g., a dataset that indicates how vehicles and/or other agents have historically traversed a path within an area) by intelligently identifying and aggregating trajectories collected using sensor systems associated with vehicles (or perhaps other agents) in a way that accounts for the variance in traversed paths as well as the differences between the exhibited driving behavior and desirable autonomous driving behavior. At a high level, the disclosed technique may involve: (i) identifying a set of trajectories traveled through a path within an area, (ii) for each of two or more sampling positions along the path, (a) determining a respective set of intersection points between the identified set of trajectories and the sampling position and (b) generating a respective aggregation of the respective set of intersection points, and (iii) based on the generated aggregations for the two or more sampling positions along the path, deriving a path-prior dataset for the path. In practice, this disclosed technique for deriving a path-prior dataset according to the disclosed technology may be carried out by a remote data processing system, although other implementations are possible as well.

FIGS. 3A-3G illustrate possible examples of how the disclosed technique may be used to derive a path-prior dataset using sensor data captured by sensor systems associated with vehicles operating in a same real-world environment, such as example vehicle 104.

Figure 3A:
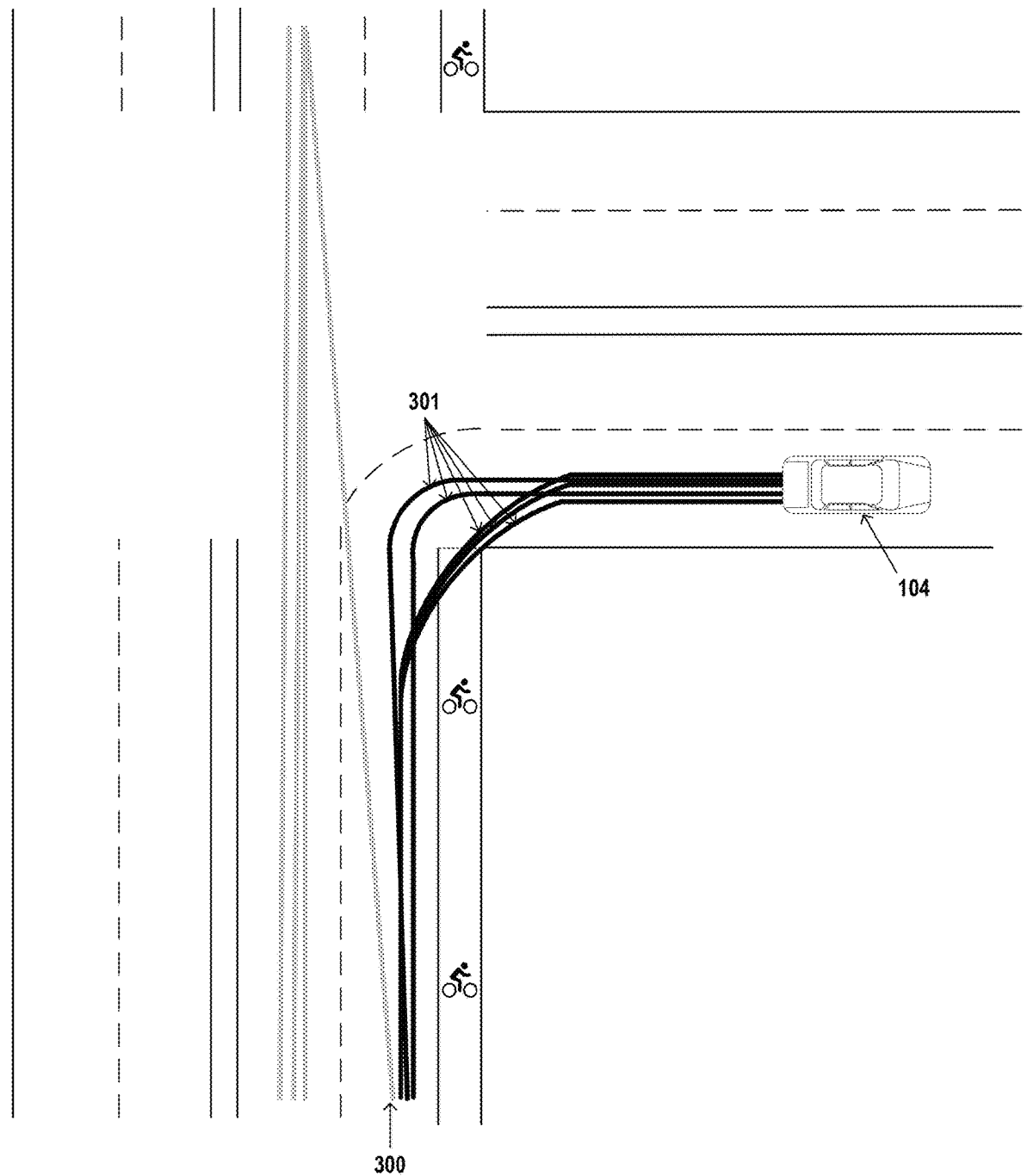
FIG. 3A is a diagram that illustrates one example of a set of trajectories that can be identified as having traveled through an area in accordance with the present disclosure.

As noted above, the disclosed technique may begin with an identification of a set of trajectories traveled through a path within an area, such as a set of trajectories that have been derived from sensor data captured by sensor systems associated with vehicles that have traversed the area. One possible example of this function is illustrated in FIG. 3A, which shows an identification of a set of trajectories 301 that traveled through a path (e.g., the rightmost lane 300) within the illustrated real-world environment. As discussed in further detail below, the function of identifying which particular set of trajectories are associated with a path may take various forms.

Figure 3B:
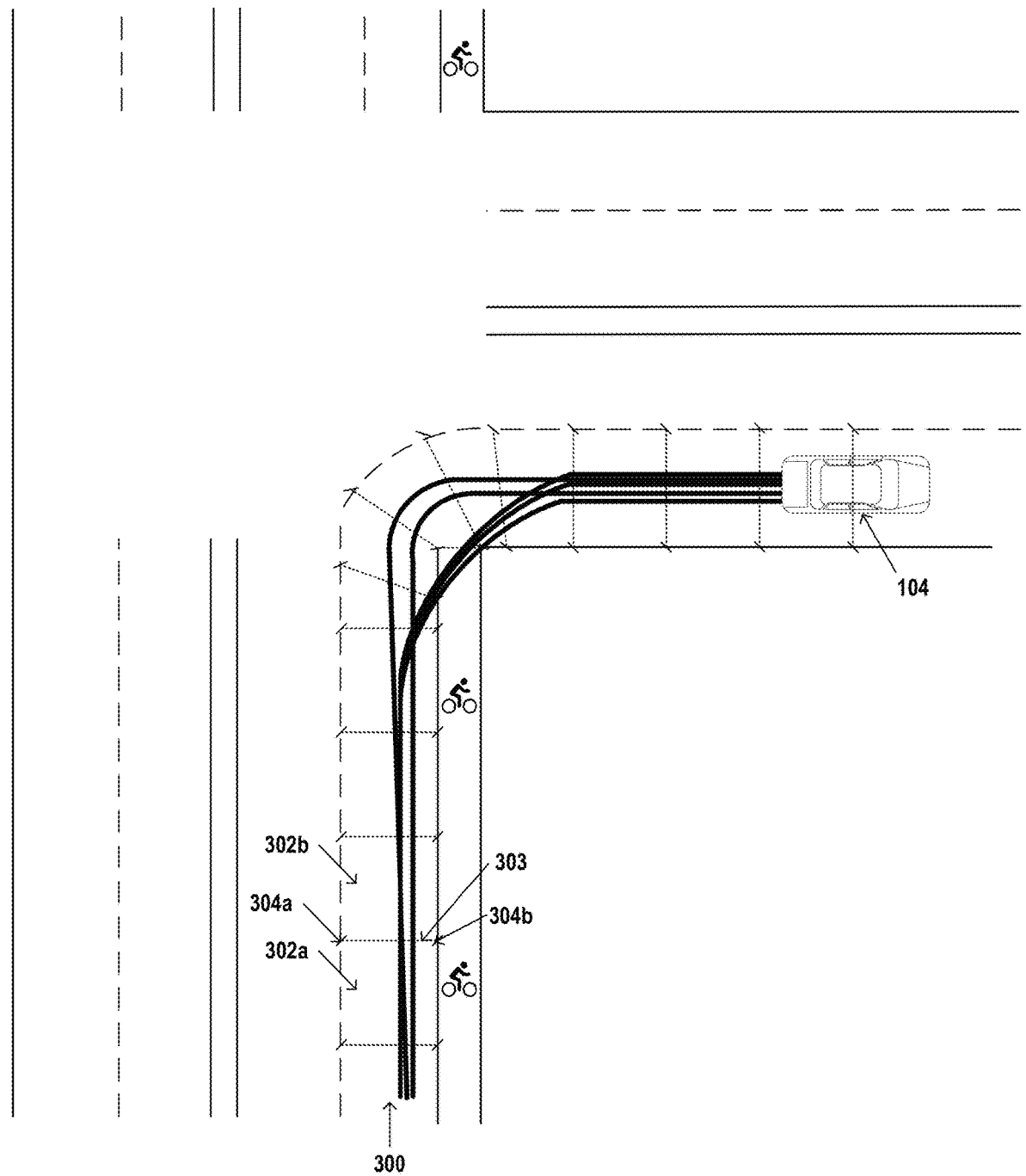
FIG. 3B is a diagram that illustrates one example of a sequence of contiguous segments that can be identified as representing a path in accordance with the present disclosure.

Additionally, the disclosed technique may involve identifying two or more sampling positions along the path. For instance, as one possibility, this function may involve identifying a sequence of contiguous segments that represent the path, where each respective pair of two consecutive segments in the sequence defines a respective segment border within the path that defines a respective sampling position along the path. One possible example of this function is illustrated in FIG. 3B, which shows that (i) a particular sequence of contiguous segments have been identified for the rightmost lane 300, of which contiguous segments 302a and 302b are examples, (ii) there are respective segment borders between the pairs of consecutive segments within the sequence of contiguous segments may define respective sampling positions along the path, of which segment border 303 is an example, and (iii) the respective segment borders between the pairs of consecutive segments are defined by a pair of segment points, of which segment points 304a and 304b are examples. As discussed in further detail below, the function of identifying a path's sequence of contiguous segments may involve either generating the sequence of contiguous segments for the path in the first instance or relying on a previously-generated sequence of contiguous segments for the path, among other possibilities.

Figure 3C:
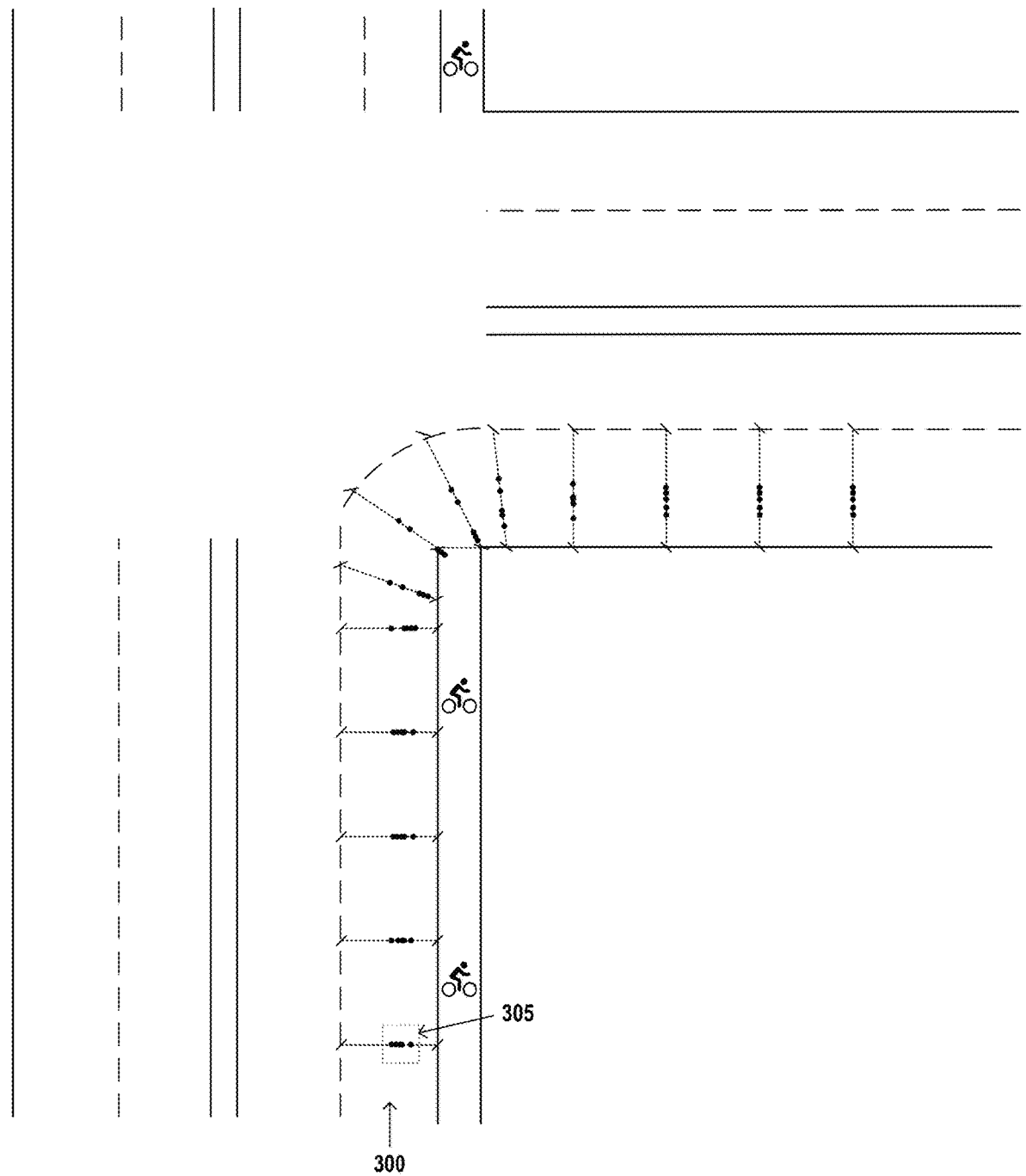
FIG. 3C is a diagram that illustrates one example of intersection points that may be determined between a set of trajectories and borders of the respective segments of a path in accordance with the present disclosure.

The disclosed technique may further involve, for each of the two or more sampling positions along the path, determining a respective set of intersection points between the identified set of trajectories and the sampling position. One possible example of this function is illustrated in FIG. 3C. In particular, FIG. 3C shows that respective sets of intersection points have been determined between the identified set of trajectories 301 and the respective segment borders for the rightmost lane 300, including the example set of intersection points 305 between the set of trajectories 301 and the segment border 303 between contiguous segments 302a and 302b.

Figure 3D:
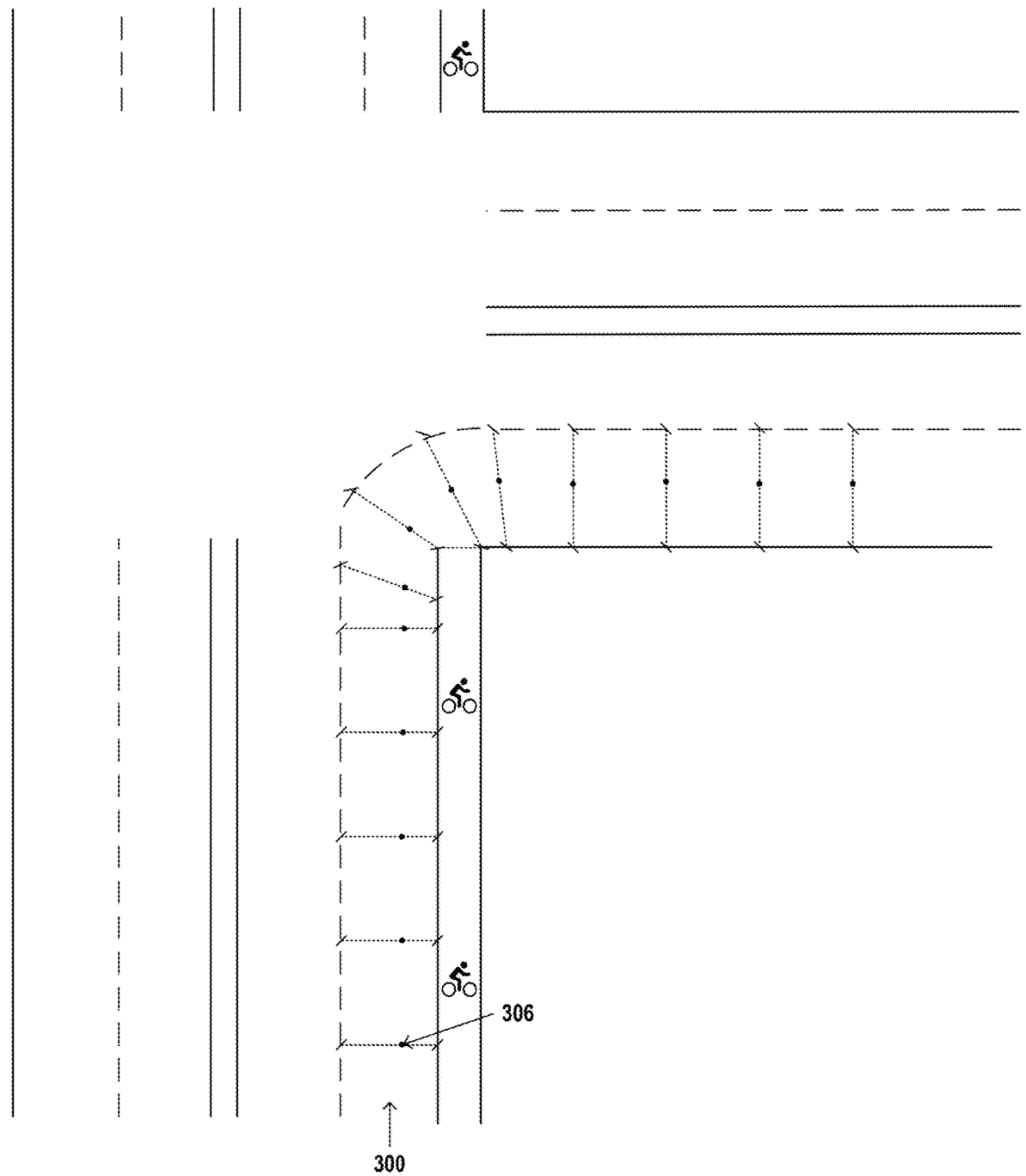
FIG. 3D is a diagram that illustrates one example of aggregated intersection points that may be determined for respective segments of a lane in accordance with the present disclosure.

Further yet, the disclosed technique may involve, for each of the two or more sampling positions along the path, generating an aggregation of the respective set of intersection points. The function of generating an aggregation of the respective set of intersection points may take various forms. For instance, one possible example of this function is illustrated in FIG. 3D. In particular, FIG. 3D shows that an aggregated intersection point has been produced for each segment border, including the example aggregated intersection point 306 that has been produced by aggregating the example set of intersection points 305 between the set of trajectories 301 and the segment border 303 between contiguous segments 302a and 302b. As discussed in further detail below, the function of aggregating a sampling position's set of intersection points together to produce an aggregated intersection point for the sampling point may take various forms, including but not limited to unweighted and/or weighting averaging of the intersection points.

Figure 3E:
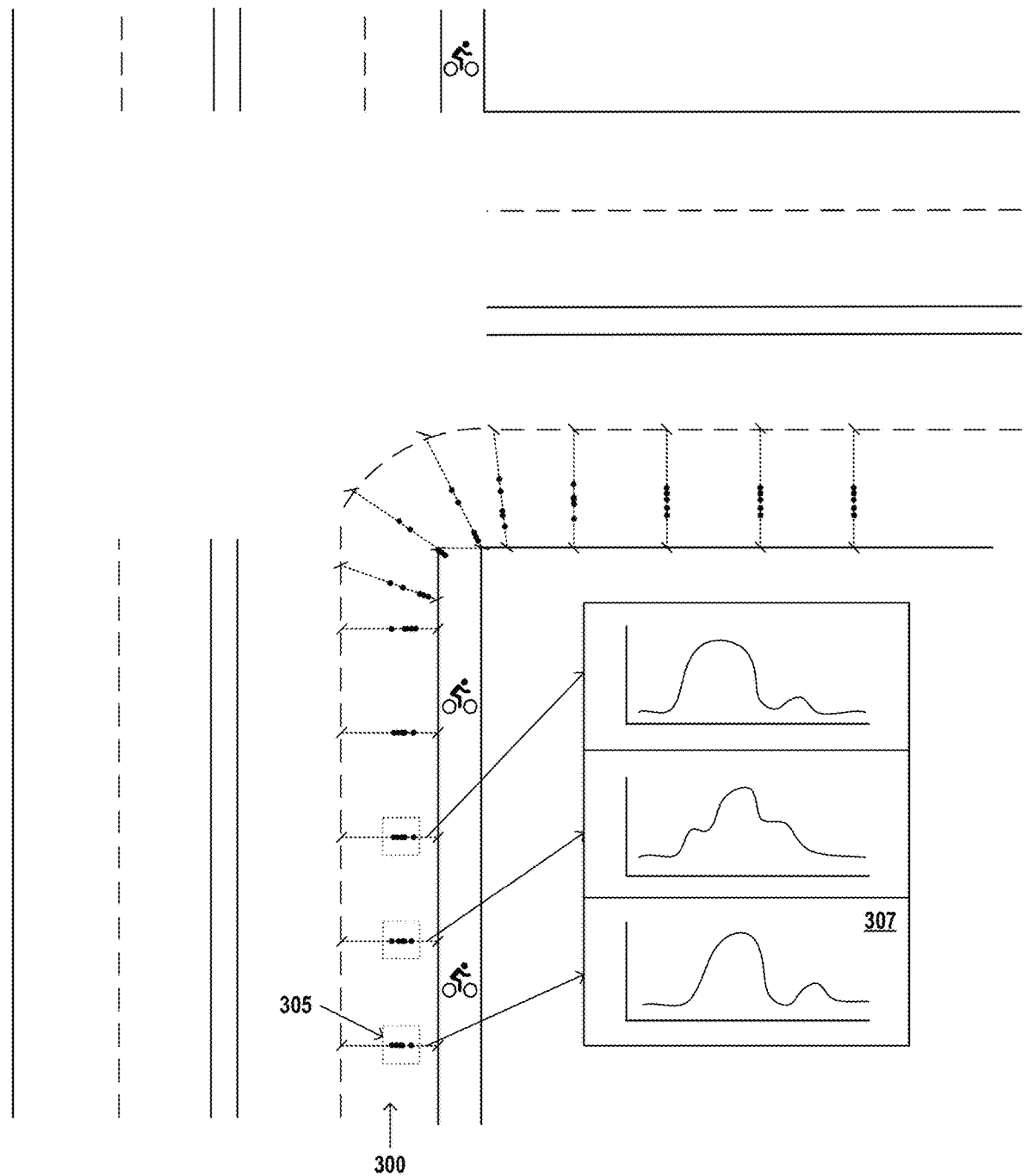
FIG. 3E is a diagram that illustrates one example of a distribution that may be generated using intersection points that were determined between the set of trajectories and the borders of the respective segments of the path in accordance with the present disclosure.

Another possible example of generating an aggregation of the respective set of intersection points is illustrated in FIG. 3E. In particular, FIG. 3E shows that the set of aggregated intersection points 305 has been used to generate a respective distribution of intersection points for each sampling position, of which distribution 307 is an example. The function of generating an aggregation of the respective set of intersection points may take other forms as well.

Figure 3F:
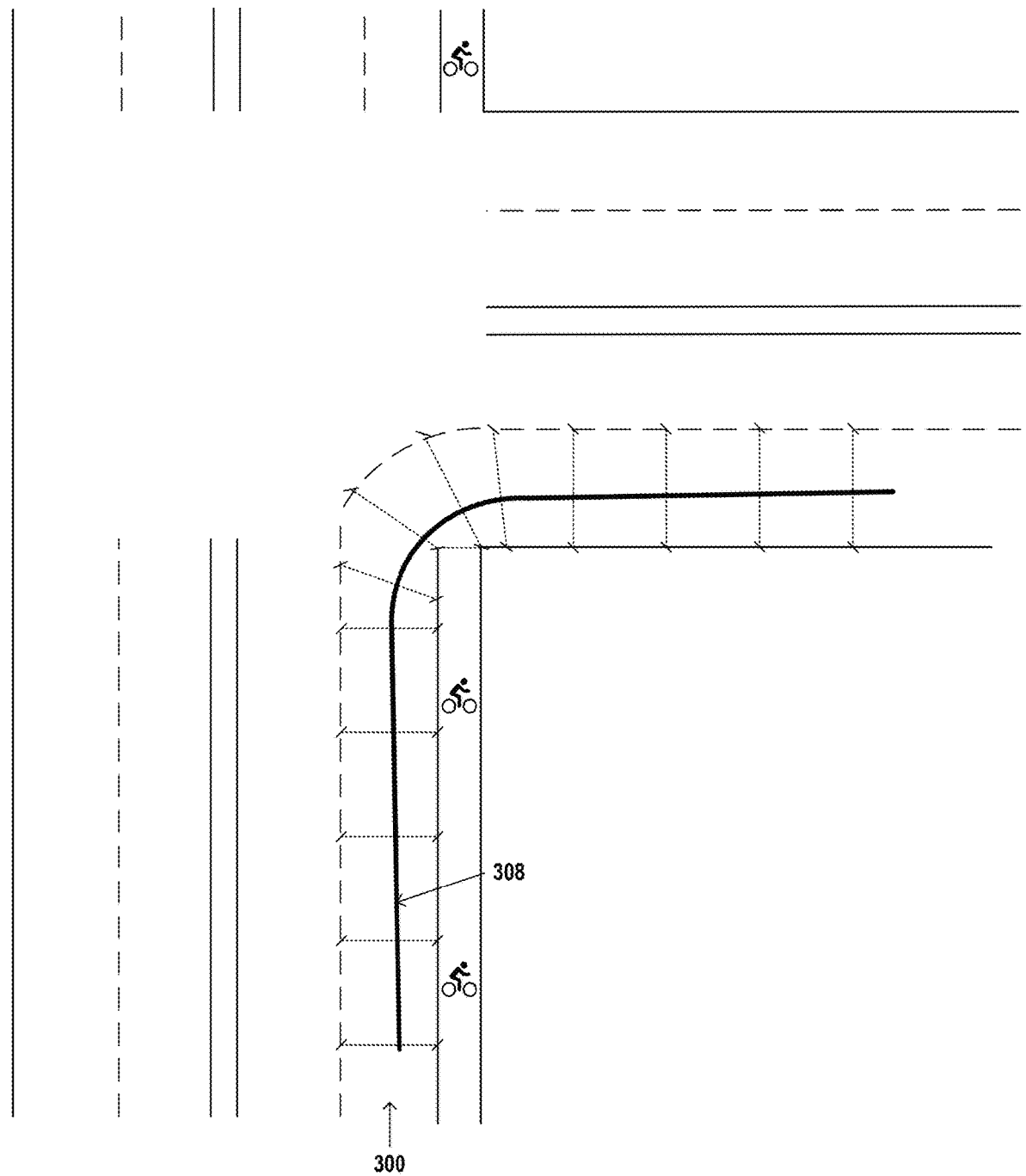
FIG. 3F is a diagram that illustrates one example of a path prior that may be generated using a path-prior dataset derived from the aggregated intersection for the path in accordance with the present disclosure.
Figure 3G:
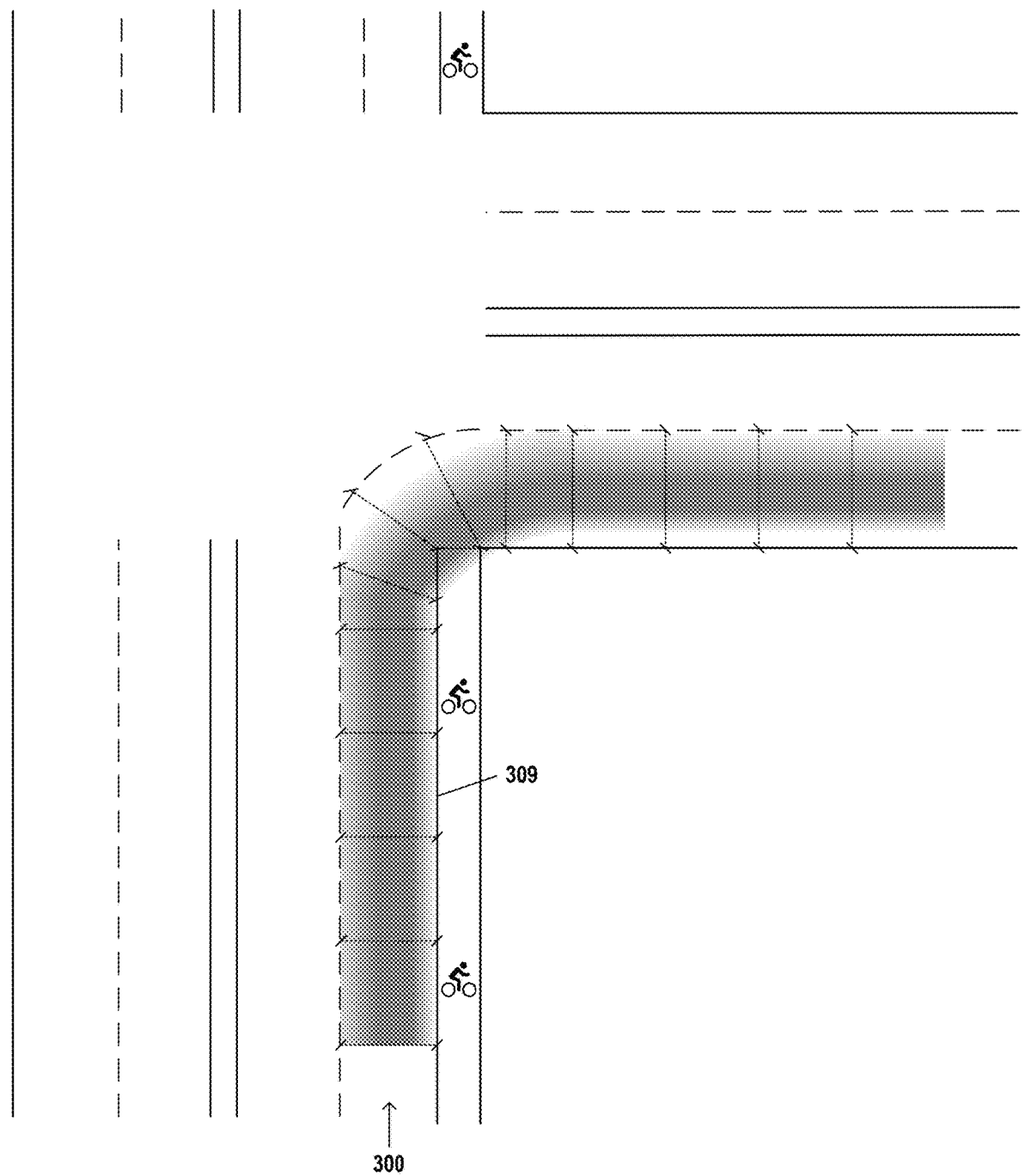
FIG. 3G is a diagram that illustrates one example of a data representation of the distributions of the trajectories traveled through the path in accordance with the present disclosure.

Lastly, the disclosed technique may involve deriving a path-prior dataset for the path based on the respective aggregations generated for the two or more sampling positions along the path. One example of this function illustrated in FIG. 3F, which shows that the aggregated intersection points produced for each segment border the rightmost lane 300 have been used to derive a representative path prior 308 for the rightmost lane 300 in the illustrated real-world environment. As discussed in further detail below, deriving a representative path prior for a path based on aggregated intersection points produced for the two or more sampling positions along the path may take various forms, including but not limited to inputting the aggregated intersection points into a motion model. Further, another example of this function may involve deriving a path-prior dataset for the path based on respective distributions of intersection points that have been generated for the sampling positions along the path, which could take the form of a data representation of the distributions or a "heat map" of the trajectories traveled through the path that is derived from the distributions. One example of this is illustrated in FIG. 3G, which shows an example "heat map" 309 that has been derived from the distributions shown in FIG. 3E.

Thus, as shown, the disclosed technique provides a way to take trajectories collected by various types of sensor systems associated with various different vehicles—which may vary and/or may not necessarily comply with the guidelines for autonomous operation by a vehicle—and intelligently aggregate these trajectories together to produce a path-prior dataset that can be used for any of the various purposes described above (e.g., for purposes of planning more naturalistic paths for vehicles engaging in autonomous operation). In this respect, the disclosed technique may advantageously enable path-priors data to be provided for a much larger universe of roads, because such path-priors data can now be generated from sensor data collected by not only by 360° sensor systems, but also by other types of sensor systems that are less expensive and/or and more widely available than 360° sensor systems.

Figure 4:
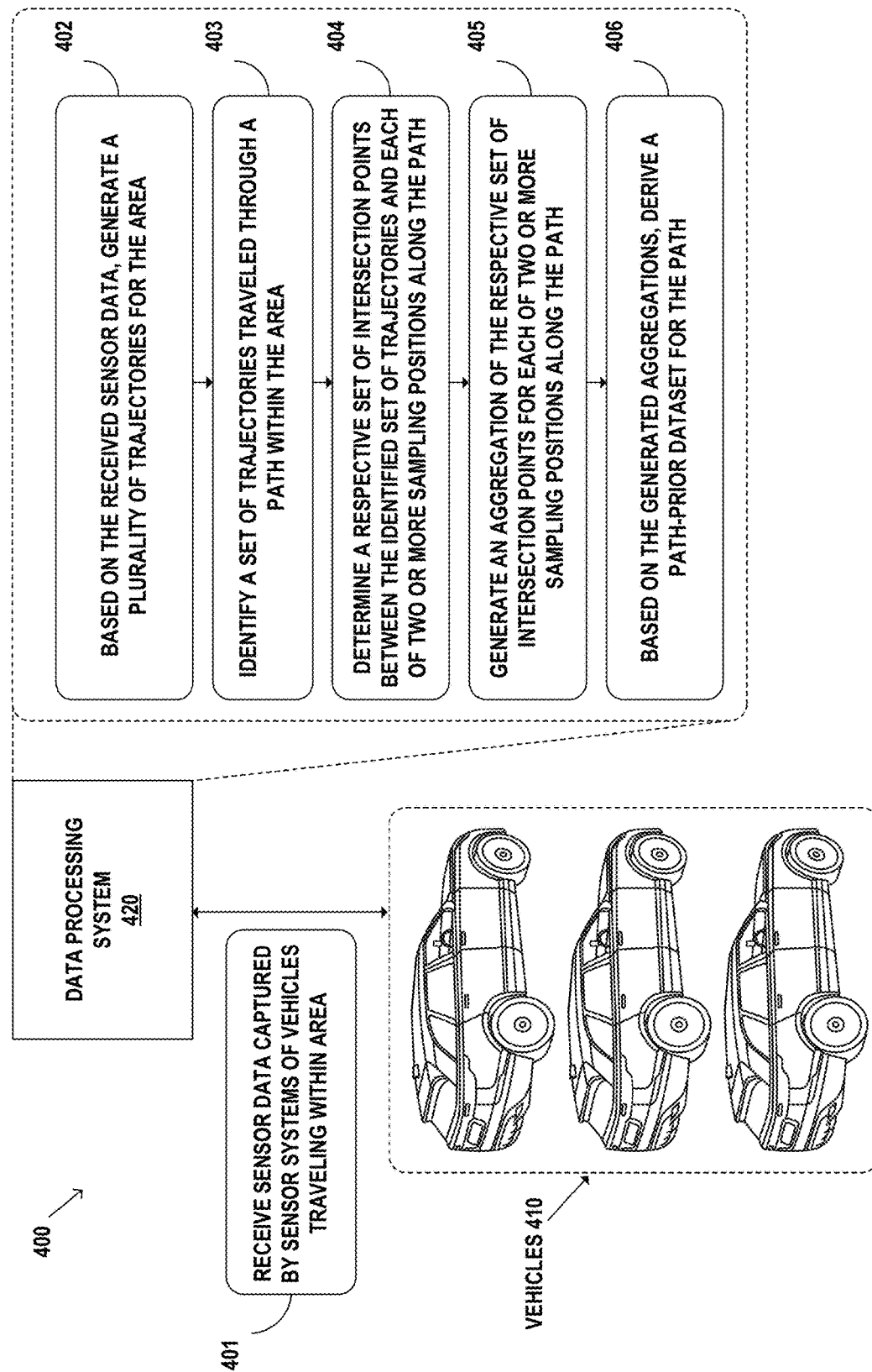
FIG. 4 is a simplified block diagram that illustrates one example embodiment of the disclosed technique for deriving a path-prior dataset based on trajectories collected by one or more vehicles.

Turning now to FIG. 4, a simplified block diagram 400 is shown that depicts one example embodiment of the disclosed technique for deriving a path-prior dataset based on trajectories collected by one or more vehicles. As shown, this example embodiment is described as being carried out in an example system arrangement that includes vehicles 410 having co-located sensor systems and a data processing system 420. In this respect, the sensor system of each of the vehicles 410 may generally comprise any system of one or more sensors, embodied in any form, that is capable of capturing sensor data and/or other localization information from which a trajectory having a given level of accuracy (e.g., lane-level accuracy) can be derived—including but not limited to camera-based sensor systems, telematic-only sensor systems, 360° sensor systems, and/or other types of sensor systems. In turn, data processing system 420 may generally comprise any one or more computing systems that collectively comprise a communication interface, an input/output (I/O) interface, a processor, data storage, and executable program instructions for carrying out functions related to the present disclosure. These one or more computing systems of data processing system 420 may take various forms and be arranged in various manners.

For instance, as one possibility, data processing system 420 may comprise computing infrastructure of a public, private, and/or hybrid cloud (e.g., computing and/or storage clusters) that has been provisioned with software for carrying out one or more of the functions disclosed herein. In this respect, the entity that owns and operates data processing system 420 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, data processing system 420 may comprise one or more dedicated servers that have been provisioned with software for carrying out one or more of the functions disclosed herein. Other implementations of data processing system 420 are possible as well.

While the functions of the example embodiment are described as being performed by data processing system 420, it should also be understood that another computing system may perform the example functions. Likewise, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 4, the block diagram 400 may begin at block 401 with data processing system 420 receiving sensor data that was captured by the sensor systems of vehicles 410 while such vehicles were traveling in a given area (e.g., a real-world environment). The data processing system 420 may receive sensor data that was captured by the sensor systems of vehicles 410 in various manners.

In one example, the data processing system 420 may receive sensor data that was captured by the sensor systems of vehicles 410 via a data network, which may include one or more Wide-Area Networks (WANs) (e.g., the Internet or a cellular network), Local-Area Networks (LANs), and/or Personal Area Networks (PANs).

In another example, the data processing system 420 may receive sensor data that was captured by the sensor systems of vehicles 410 by virtue of accessing one or more storage devices that have been communicatively coupled to the data processing system 420 via the data processing system's I/O interface or the like. Such storage devices on which the sensor data that was captured by the sensor systems of vehicles 410 is stored may take various forms. As examples, the storage devices may take the form of disk drives, flash drives, memory cards, smartphones, tablets, laptops, notebooks, or any other device with inbuilt accessible storage.

The data processing system 420 may receive the sensor data that was captured by the sensor systems of vehicles 410 in other manners as well.

Further, the sensor data that was captured by the sensor systems of vehicles 410 and received by the data processing system 420 may take various forms. In one example, the sensor data that was captured by the sensor systems of vehicles 410 may include image data captured by a monocular camera, a stereo camera, and/or another type of camera. As another example, the sensor data that was captured by the sensor systems of vehicles 410 may comprise state data captured by an IMU (which may be comprised of accelerometers, gyroscopes, and/or magnetometers), an Inertial Navigation System (INS), a Global Navigation Satellite System (GNSS) unit such as a GPS unit, and/or some other type of state sensor. As yet another example, the sensor data that was captured by the sensor systems of vehicles 410 may comprise LiDAR data, Radio Detection and Ranging (RADAR) data, and/or Sound Navigation and Ranging (SONAR) data. The sensor data that was captured by the sensor systems of vehicles 410 and received by the data processing system 420 may take other forms as well.

At block 402, the data processing system 420 may generate a plurality of trajectories from the sensor data that was captured by the sensor systems of vehicles 410. This function may take various forms, which may depend in part on the form of the sensor data that is received.

As one possibility, the function of generating a plurality of trajectories from the sensor data that was captured may involve processing a received sensor dataset that has been collected by a sensor system of a given vehicle using a technique such as Simultaneous Localization and Mapping (SLAM) (e.g., visual SLAM) and thereby extracting a time sequence of location information (e.g., position and orientation values) for the given vehicle, which may then be used to define the trajectory. The function of generating a trajectory from sensor data may take other forms as well.

Turning back to FIG. 4, at block 403, the data processing system 420 may identify a set of trajectories traveled through a path within an area. This function may take various forms.

For instance, as one possibility, the function of identifying a set of trajectories traveled through the path within the area may first involve (i) selecting a lane or series of lanes of interest that are included within the path, and (ii) determining which of the generated plurality of trajectories traveled through the selected lane segment or series of lane segments of interest.

In this respect, the function of selecting a lane or series of lanes of interest may involve using semantic map data to select at least one lane identifier or series of lane identifiers for which to derive a path-prior dataset. This function may further involve identifying lane identifiers that are ahead, behind, or adjacent to the lane identifier of interest to further refine the lane identifiers through which the plurality of trajectories has traveled.

In turn, the function of determining which of the plurality of trajectories traveled through the selected lane(s) may involve (i) using the at least one lane identifier or series of lane identifiers of interest to access map data that defines geospatial information of the selected lane(s) (e.g., semantic map data), (ii) comparing the map data that defines the geospatial information of the selected lane(s) to the data defining the plurality of trajectories, and (iii) based on this comparing, determining which of the plurality of trajectories traversed the selected lane(s) in whole or in part.

In some circumstances, it may also be the case that a trajectory is determined to have traveled through both the selected lane(s) and also one or more other lanes (e.g., due to a lane change or a turn). In these circumstances, one portion of the trajectory may be useful to the data processing system 420 for purposes of deriving a path-prior dataset for a given lane of interest, while other portions might not be. In this respect, the data processing system 420 may function to segregate such a trajectory path into multiple portions and then select the portion(s) of the trajectory that traverse the selected lane(s) while filtering out the portion(s) of the trajectory that do not traverse the selected lane(s). As part of this function, the data processing system 420 may select the segment points for the trajectory in a way that allows for filtering of not just the part of the trajectory that falls outside of the selected lane(s) but perhaps also some preceding or subsequent part of the trajectory that may fall within the selected lane(s) but is associated with a transition from the selected lane(s) to another lane.

One possible example of the function of identifying a set of trajectories that have traveled through a path within an area was previously illustrated and described above with respect to FIG. 3A. As shown in FIG. 3A, the plurality of trajectories included both the grayed-out trajectories as well as the set of trajectories 301. In practice, a data processing system may have been tasked with deriving a path-prior dataset for the rightmost lane 300 of the real-world environment shown in FIG. 3A. In this respect, the data processing system identified that the set of trajectories 301 traveled through the rightmost lane 300 and did not identify the trajectories that traveled through the left lane or the trajectory that began in the rightmost lane 300 and crossed into the left lane. As a result, the data processing system narrowed down the universe of trajectories that traverse the real-world environment to just those associated with the lane of interest (e.g., the rightmost lane 300) of the path.

Turning back to FIG. 4, at block 404, the data processing system 420 may determine a respective set of intersection points between the identified set of trajectories and each of two or more sampling positions along the path. This function may take various forms.

In one implementation, function of determining a respective set of intersection points between the identified set of trajectories and each of two or more sampling positions along the path may involve (i) identifying a sequence of contiguous segments that represent the path, where each respective pair of two consecutive segments in the sequence may define a respective segment border within the path that defines a sampling position along the path, and (ii) determining a respective set of intersection points between the identified set of trajectories and each of two or more such segment borders.

The function of identifying a sequence of contiguous segments that represent the path may take various forms. As one possibility, identifying a sequence of contiguous segments that represent the path may involve segmenting the path into segments based on boundaries of the path. In this respect, segmenting the path into segments may involve identifying respective pairs of segment points, where one segment point in a pair is located on the leftmost boundary of a given segment and the other segment point in the pair is located on the rightmost boundary of the given segment. After identifying a respective pair of segment points, that pair of segment points may be connected to form a segment border. The function of identifying the respective pairs of segment points may take various forms, which may depend on the geometry of the path boundaries for a given segment.

In one example, identifying the respective pairs of segment points may involve determining a number of desired segments by which to segment a path. In turn, a boundary of the path may be divided by the number of desired segments to determine the locations at which to identify segment points along the path boundary. For instance, if five segments are desired for a path that is 20 meters in length, respective segment points may be identified uniformly in four meter increments along one of the path's boundaries (e.g., rightmost lane boundary if the path is represented as one or more lanes). Once the respective segment points are identified for that path boundary, corresponding segment points can be identified for the other path boundary (e.g., leftmost lane boundary).

In another example, identifying the respective pairs of segment points may involve (i) uniformly identifying respective segment points at a predefined distance interval along a path boundary, and (ii) determining corresponding segment points for the other path boundary.

In yet another example, if the path boundaries for the path include a curvature, identifying the respective pairs of segment points may involve (i) identifying respective segment points for an inner path boundary using one of the examples described above, (ii) determining a mathematical relationship between the inner path boundary and the outer path boundary (e.g., via interpolation or the like), and (iii) identifying corresponding segment points for the outer path boundary based on the mathematical relationship between the inner path boundary and the outer path boundary.

The function of identifying the respective pairs of segment points for use in segmenting the path may take other forms as well.

Further, the path boundaries of the path lane may be determined in various ways. In one example, the path boundaries may be determined based on map data (e.g., semantic map data). In this respect, the data processing system 420 may simply access the map data associated with the path in the real-world environment. In another example, some portions of the path boundaries may not be available in the map data, in which case the path boundaries may be determined by linearly interpolating between the portions of the path boundaries that are available in the map data. In practice, there might not be a sufficient number of path boundaries present in the semantic map data, or the segment might not have an associated path boundary in the map data (e.g., a boundary defining a turn may not be defined within the map data). In this respect, linearly interpolating the available portions of the path boundaries in the map data (e.g., by using a trajectory with a constant velocity) may provide additional portions of the path boundaries as to allow the data processing system 420 to identify a sequence of contiguous segments that represent the path. The path boundaries may be determined in other ways as well.

In another example, identifying a sequence of contiguous segments that represent the path may involve obtaining a previously-generated sequence of contiguous segments for the path, which could be encoded into map data (e.g., semantic map data) or the like.

The function of identifying a sequence of contiguous segments that represent the path may take other forms as well. Further, it should be understood that the sequence of contiguous segments that represent the path may be identified at various times, including but not limited to the possibility that the sequence of contiguous segments may be identified prior to the identification of the set of trajectories.

One possible example of the function of identifying a sequence of contiguous segments that represent the path was previously illustrated and described above with respect to FIG. 3B. As shown in FIG. 3B, a data processing system may have identified a sequence of contiguous segments that represent the given lane, of which contiguous segments 302a and 302b are an example. Further, as shown, contiguous segments 302a and 302b define a respective segment border within the right lane, of which segment border 303 is an example. Further yet, as shown, segment border 303 is defined by the connection between a respective pair of segment points 304a and 304b.

As noted above, after identifying the sequence of contiguous segments that represent the path, the identifying determining a respective set of intersection points between the identified set of trajectories and each of two or more such segment borders, the function at block 404 may then involve determining a respective set of intersection points between the identified set of trajectories and each of two or more segment borders. This function may take various forms as well.

For instance, as one possibility, the data processing system 420 may determine the points at which each of the identified set of trajectories intersect with each respective segment border of the path. As a result, the determined points may represent the trajectories as a set of intersection points along each of the segment borders.

One possible example of the function of determining a respective set of intersection points between the identified set of trajectories and a respective segment border was previously illustrated and described above with respect to FIG. 3C. As shown in FIG. 3C, a data processing system may have determined intersection points between the identified set of trajectories and a respective segment border, of which intersection points 305 is an example.

At block 405 of FIG. 4, the data processing system 420 may generate an aggregation of the respective set of intersection points for each of two or more sampling positions along the path. The function of generating an aggregation of the respective set of intersection points may take various forms.

In one implementation, the function of generating an aggregation of a respective set of intersection points for a given sampling position may involve aggregating the respective set of intersection points for the given sampling position together to produce an aggregated intersection point for the given sampling position. This function may take various forms.

As one possibility, the function of aggregating a respective set of intersection points for a given sampling position together to produce an aggregated intersection point for the given sampling position may involve calculating an unweighted average of the set of intersection points, such as a mean or a median of the set of intersection points at the given sampling position.

As another possibility, the function of aggregating the respective set of intersection points for a given sampling position together to produce an aggregated intersection point for the given sampling position may involve calculating a weighted average of the set of intersection points. The function of calculating a weighted average may involve assigning a weight to each intersection point in the set of intersection points. The factors considered when assigning the weight to each intersection point in the set of intersection points may take various forms. In one example, the weight assigned to each intersection point may be based on a distance to a reference point (e.g., a center point of a segment border), where intersection points closer to the reference point are assigned higher weights, while intersection points farther away from the reference point are assigned lower weights—which may even include negative weights if the intersection points are a threshold distance away from the reference point. In another example, the weight assigned to each intersection point may be based on whether the intersection point is within the boundaries of the given path, where intersection points inside the boundaries of the given path are assigned a higher weight, while points outside the boundaries are assigned a lower weight—which may include a negative weight depending on aspects of the real-world environment surrounding the given path.

As yet another possibility, the function of aggregating the respective set of intersection points for a given sampling position together to produce an aggregated intersection point for the given sampling position may involve selecting an intersection point that is the furthest away from a given path boundary. The function of selecting an intersection point that is further away from a given path boundary may involve determining that one of the two boundaries of a given path is more safety critical (e.g., by virtue of being adjacent to elements of the real-world environment near which a vehicle should operate with a heightened standard of care) and then electing an intersection point that is the furthest away from that path boundary. Examples of such safety critical lane boundaries may include a path boundary that is adjacent to a bike lane, pedestrian walkway, etc.

The function of aggregating a respective set of intersection points for a given sampling position together to produce an aggregated intersection point for the given sampling position may take other forms as well.

One illustrative example of the function of aggregating the respective set of intersection points together to produce an aggregated intersection point for each of the two or more sampling positions along the path was previously shown and described above with respect to FIG. 3D.

Referring back to FIG. 4, in another implementation, the function of generating an aggregation of a respective set of intersection points for a given sampling position may involve generating a respective distribution of the respective set of intersection points for the given sampling position (e.g., a probabilistic distribution of the respective set of intersection points). In this respect, such a distribution may take various forms, including but not limited to a dataset and/or an equation that indicates the extent to which prior vehicles passed through each of various possible intersection points at the given sampling position. Further, the function of generating a respective distribution of the respective set of intersection points for the given sampling position may take various forms, and may involve operations such as filtering (e.g., removing intersection points that fall outside path boundaries) and/or weighting (e.g., assigning some points different weights than others).

One illustrative example of generating a distribution of a respective set of intersection points for a given sampling position was previously shown and described above with respect to FIG. 3F. In particular, FIG. 3F shows that respective distributions of intersection points have been generated for each of three different sampling positions along a path (e.g., segment borders as shown), of which distribution 307 is an example. As shown, the distribution 307 shows that there are a number of trajectories close to the center point of the rightmost lane 300, with one trajectory off-center to the right of the rightmost lane 300. As discussed in further detail below, the distribution 307 can be encoded into a path-prior dataset that is used to determine a plurality of planned paths for a vehicle, which may be advantageous in situations where the vehicle is experiencing less-than-ideal driving conditions (e.g., inclement weather, obstacles, etc.).

Referring back to FIG. 4, at block 406, the data processing system 420 may derive a path-prior dataset for the path based on the generated aggregations of the respective sets of intersection points for the two or more sampling positions. This function may take various forms, which may depend on the form of the generated aggregations for the two or more sampling positions.

As one possibility, when the generated aggregation for each of the two or more sampling positions along the path is an aggregated intersection point, the function of deriving a path-prior dataset for the path may involve the data processing system 420 compiling the aggregated intersection points for the two or more sampling points into a set of data points that defines a representative path prior.

As another possibility, when the generated aggregation for each of the two or more sampling positions along the path is an aggregated intersection point, the function of deriving a path-prior dataset for the path may involve inputting the aggregated intersection points for the two or more sampling points into a motion model that functions to evaluate the path defined by the aggregated intersection points from the perspective of what would be physically be possible in terms of real-world motion behavior of a vehicle and then outputs a "smoothed" version of the aggregated intersection points, which may be used to define a representative path prior for the path. Such a motion model may take various forms, one example of which is a Kalman filter. Further, in order to use such a motion model, the data processing system 420 may first need to perform certain functions to prepare the aggregated data points for input into the motion model, such as by assigning a respective timestamp to each aggregated intersection point using a constant velocity.

As yet another possibility, when the generated aggregation for each of the two or more sampling positions along the path is an aggregated intersection point, the function of deriving a path-prior dataset for the path may involve determining a function that fits the set of aggregated intersection points for the two or more sampling points. In this respect, the determined function may be used as the representative path prior.

As part of deriving a path-prior dataset for the path in one of the manners described above, the data processing system 420 may also linearly interpolate the aggregated intersection points to obtain additional aggregated intersection points for use in deriving a path-prior dataset for the path.

One possible example of the function of deriving a representative path prior based on aggregated intersection points produced for segment borders within a given lane was previously illustrated and described above with respect to FIG. 3F.

Referring back to block 406 of FIG. 4, when the generated aggregation for each of the two or more sampling positions along the path is a generated distribution of the respective set of intersection points for the sampling position, the function of deriving a path-prior dataset for the path may involve encoding the generated distributions for the two or more sampling positions into a path-prior dataset for the path. Such a path-prior dataset may be particularly advantageous as it may facilitate a more flexible approach to path planning. For instance, a path-prior dataset that comprises respective distributions of intersection points for the two or more sampling positions can be used to determine different possible planned paths depending on the circumstances being faced by a vehicle.

For example, if a vehicle is operating under "normal" circumstances, the respective distributions of intersection points for the two or more sampling positions can be used to determine a planned path for the vehicle that corresponds to the most-likely intersection points at the two or more sampling positions along the path. In another example, if a vehicle finds itself in an abnormal position while traveling along a path (e.g., due to avoiding an obstacle), the respective distributions of intersection points for the two or more sampling positions can be used to determine a planned path for the vehicle that corresponds intersection points at the two or more sampling positions along the path that are not the most-likely intersection points (because may not be possible or desirable for the vehicle to traverse those intersection points due to its abnormal location) but are nevertheless shown to be reasonably-likely intersection points within the respective distributions. In yet another example, if the vehicle is faced with undesirable driving conditions (e.g., inclement weather, etc.), the respective distributions of intersection points for the two or more sampling positions can be used to determine a planned path for the vehicle that corresponds intersection points at the two or more sampling positions along the path that are not the most-likely intersection points (because may not be possible or desirable for the vehicle to traverse those intersection points due to the undesirable driving conditions) but are nevertheless shown to be reasonably-likely intersection points within the respective distributions. The generated distributions for the two or more sampling positions can be used in various other manners as well.

As another possibility, when the generated aggregation for each of the two or more sampling positions along the path is a generated distribution of the respective set of intersection points for the sampling position, the function of deriving a path-prior dataset for the path may involve deriving a "heat map" 309 of the trajectories traveled through the path from the generated distributions. One example of a "heat map" 309 is illustrated in FIG. 3G. As shown in FIG. 3G, the "heat map" 309 uses darker shading to represent areas of the lane where prior trajectories were more concentrated and lighter shading to represent areas of the lane where prior trajectories were less concentrated (e.g., areas of the lane next to the lane's boundaries).

Referring back to FIG. 4, the function of deriving a path-prior dataset for the path based on the generated aggregations for the two or more sampling positions along the path may take other forms as well.

Once the path-prior dataset is derived for the given lane in the manner described, this path-prior dataset may then be used for various purposes, including but not limited to the purposes discussed above. For example, such a path-prior dataset may be used by an on-board computing system of a vehicle to assist with deriving a behavior plan for the vehicle and/or predicting behavior of surrounding agents. In another example, such a path-prior dataset may be used by a transportation-matching platform to help predict the near-term behavior of vehicles available to provide rides, which may assist in the transportation-matching platform in performing operations such as matching individuals with available vehicles within the given area, generating the most optimal routes for vehicles to follow when picking up and/or transporting individuals within the given area, providing accurate estimates of pickup and drop-off times within the given area, and/or effectively pre-positioning vehicles within the given area in anticipation of responding to transportation requests, among other possibilities. In another example, such a path-prior dataset may be used by a computing system to identify and generate data characterizing past occurrences of certain scenario types of interest within the given area, examples of which may include a "cut-in" scenario where another agent cuts in front of a vehicle, an "unprotected left" scenario where a vehicle makes an unprotected left turn at an intersection, and a "pedestrian ahead" scenario where a pedestrian is in an vehicle's field of view. The derived path-prior dataset may be used for various other purposes as well.

Figure 5:
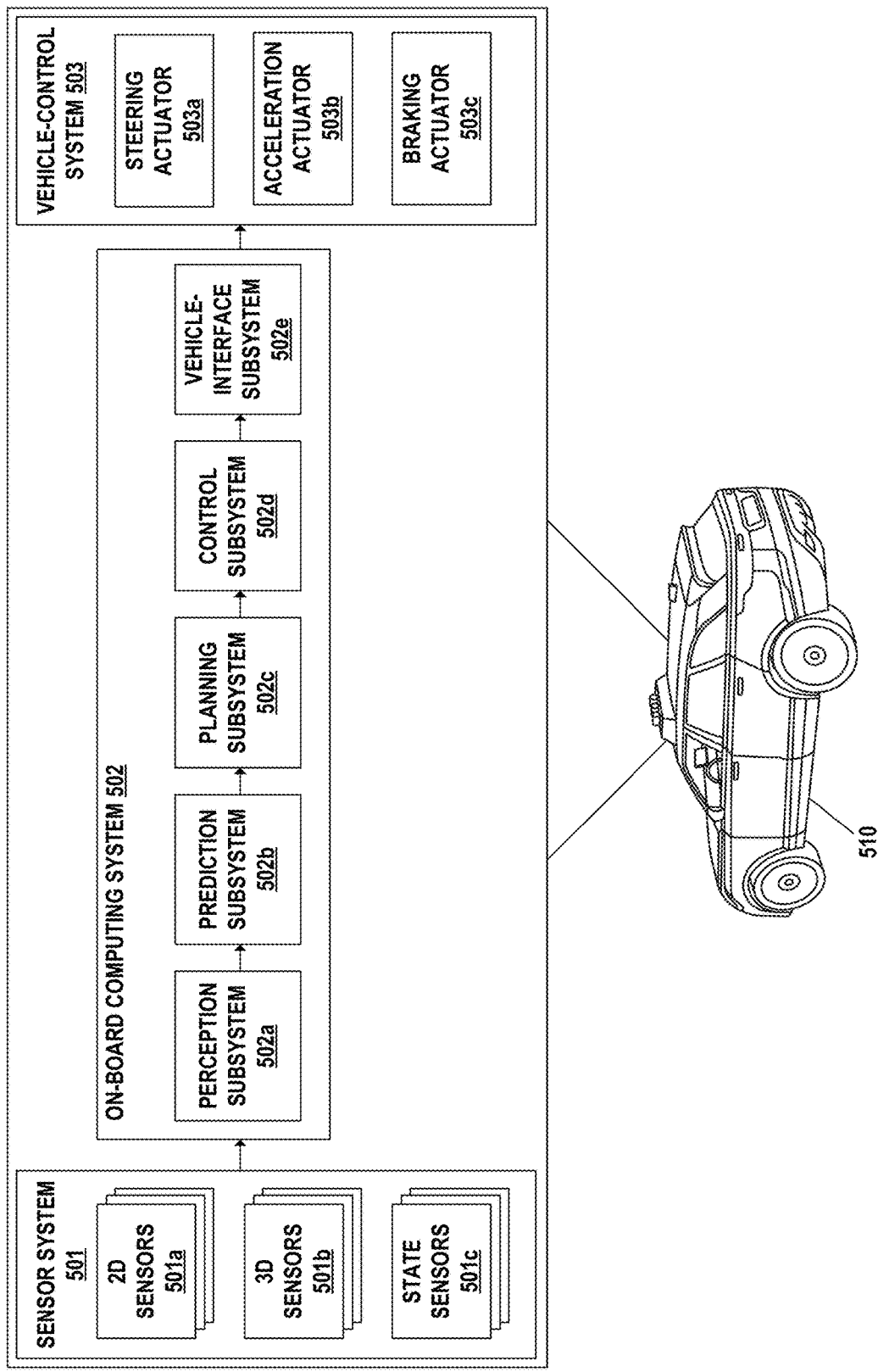
FIG. 5 is a simplified block diagram that illustrates example systems of an example vehicle equipped with autonomous technology.

Turning now to FIG. 5, a simplified block diagram is provided to illustrate certain systems that may be included in an example vehicle 510 that is capable of operating autonomously. As shown, at a high level, vehicle 510 may include at least (i) a sensor system 501 that is configured to capture sensor data that is representative of the real-world environment being perceived by the vehicle (i.e., the vehicle's "surrounding environment") and/or the vehicle's operation within that real-world environment, (ii) an on-board computing system 502 that is configured to perform functions related to autonomous operation of vehicle 510 (and perhaps other functions as well), and (iii) a vehicle-control system 503 that is configured to control the physical operation of vehicle 510, among other possibilities. Each of these vehicle systems may take various forms.

In general, sensor system 501 may comprise any of various different types of sensors, each of which is generally configured to detect one or more particular stimuli based on vehicle 510 operating in a real-world environment. The sensors then output sensor data that is indicative of one or more measured values of the one or more stimuli at one or more capture times (which may each comprise a single instant of time or a range of times).

For instance, as one possibility, sensor system 501 may include one or more two-dimensional (2D) sensors 501a that are each configured to capture 2D data that is representative of the vehicle's surrounding environment. Examples of 2D sensor(s) 501a may include a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 501a have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 501 may include one or more three-dimensional (3D) sensors 501b that are each configured to capture 3D data that is representative of the vehicle's surrounding environment. Examples of 3D sensor(s) 501b may include a LIDAR unit, a 3D RADAR unit, a 3D SONAR unit, a 3D ultrasound unit, and a camera array equipped for stereo vision, among other possibilities. Further, in an example implementation, 3D sensor(s) 501b may comprise an arrangement that is capable of capturing 3D sensor data representing a 360° view of the vehicle's surrounding environment, one example of which may take the form of a LIDAR unit that is configured to rotate 360° around its installation axis. Other 3D sensor arrangements are also possible.

As yet another possibility, sensor system 501 may include one or more state sensors 501c that are each configured to detect aspects of the vehicle's current state, such as the vehicle's current position, current orientation (e.g., heading/yaw, pitch, and/or roll), current velocity, and/or current acceleration of vehicle 510. Examples of state sensor(s) 501c may include an IMU, an INS, a GNSS such as a GPS, among other possibilities.

Sensor system 501 may include various other types of sensors as well.

In turn, on-board computing system 502 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 502 may take the form of any one or more interfaces that facilitate communication with other systems of vehicle 510 (e.g., sensor system 501, vehicle-control system 503, etc.) and/or remote computing systems (e.g., a transportation-matching management system), among other possibilities. In this respect, each such interface may be wired and/or wireless and may communicate according to any of various communication protocols, examples of which may include Ethernet, Wi-Fi, Controller Area Network (CAN) bus, serial bus (e.g., USB or Firewire), cellular network, and/or short-range wireless protocols.

Further, the processor of on-board computing system 502 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 502 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 502 such that on-board computing system 502 is configured to perform various functions related to the autonomous operation of vehicle 510 (among other possible functions), and (ii) data that may be obtained, derived, or otherwise stored by on-board computing system 502.

In one embodiment, on-board computing system 502 may also be functionally configured into a number of different subsystems that are each tasked with performing a specific subset of functions that facilitate the autonomous operation of vehicle 510, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 502.

As shown in FIG. 6, in one embodiment, the functional subsystems of on-board computing system 502 may include (i) a perception subsystem 502a that generally functions to derive a representation of the surrounding environment being perceived by vehicle 510, (ii) a prediction subsystem 502b that generally functions to predict the future state of each object detected in the vehicle's surrounding environment, (iii) a planning subsystem 502c that generally functions to derive a behavior plan for vehicle 510, (iv) a control subsystem 502d that generally functions to transform the behavior plan for vehicle 510 into control signals for causing vehicle 510 to execute the behavior plan, and (v) a vehicle-interface subsystem 502e that generally functions to translate the control signals into a format that vehicle-control system 503 can interpret and execute. However, it should be understood that the functional subsystems of on-board computing system 502 may take various other forms as well. Each of these example subsystems will now be described in further detail below.

For instance, the subsystems of on-board computing system 502 may begin with perception subsystem 502a, which may be configured to fuse together various different types of "raw" data that relate to the vehicle's perception of its surrounding environment and thereby derive a representation of the surrounding environment being perceived by vehicle 510. In this respect, the "raw" data that is used by perception subsystem 502a to derive the representation of the vehicle's surrounding environment may take any of various forms.

For instance, at a minimum, the "raw" data that is used by perception subsystem 502a may include multiple different types of sensor data captured by sensor system 501, such as 2D sensor data (e.g., image data) that provides a 2D representation of the vehicle's surrounding environment, 3D sensor data (e.g., LIDAR data) that provides a 3D representation of the vehicle's surrounding environment, and/or state data for vehicle 510 that indicates the past and current position, orientation, velocity, and acceleration of vehicle 510. Additionally, the "raw" data that is used by perception subsystem 502a may include map data associated with the vehicle's location, such as high-definition geometric and/or semantic map data, which may be preloaded onto on-board computing system 502 and/or obtained from a remote computing system. Additionally yet, the "raw" data that is used by perception subsystem 502a may include navigation data for vehicle 510 that indicates a specified origin and/or specified destination for vehicle 510, which may be obtained from a remote computing system (e.g., a transportation-matching management system) and/or input by a human riding in vehicle 510 via a user-interface component that is communicatively coupled to on-board computing system 502. Additionally still, the "raw" data that is used by perception subsystem 502a may include other types of data that may provide context for the vehicle's perception of its surrounding environment, such as weather data and/or traffic data, which may be obtained from a remote computing system. The "raw" data that is used by perception subsystem 502a may include other types of data as well.

Advantageously, by fusing together multiple different types of raw data (e.g., both 2D sensor data and 3D sensor data), perception subsystem 502a is able to leverage the relative strengths of these different types of raw data in a way that may produce a more accurate and precise representation of the surrounding environment being perceived by vehicle 510.

Further, the function of deriving the representation of the surrounding environment perceived by vehicle 510 using the raw data may include various aspects. For instance, one aspect of deriving the representation of the surrounding environment perceived by vehicle 510 using the raw data may involve determining a current state of vehicle 510 itself, such as a current position, a current orientation, a current velocity, and/or a current acceleration, among other possibilities. In this respect, perception subsystem 502a may also employ a localization technique such as SLAM to assist in the determination of the vehicle's current position and/or orientation. (Alternatively, it is possible that on-board computing system 502 may run a separate localization service that determines position and/or orientation values for vehicle 510 based on raw data, in which case these position and/or orientation values may serve as another input to perception subsystem 502a).

Another aspect of deriving the representation of the surrounding environment perceived by vehicle 510 using the raw data may involve detecting objects within the vehicle's surrounding environment, which may result in the determination of class labels, bounding boxes, or the like for each detected object. In this respect, the particular classes of objects that are detected by perception subsystem 502a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 502a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 510 using the raw data may involve determining a current state of each object detected in the vehicle's surrounding environment, such as a current position (which could be reflected in terms of coordinates and/or in terms of a distance and direction from vehicle 510), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 510, among other possibilities.

The function of deriving the representation of the surrounding environment perceived by vehicle 510 using the raw data may include other aspects as well.

Further yet, the derived representation of the surrounding environment perceived by vehicle 510 may incorporate various different information about the surrounding environment perceived by vehicle 510, examples of which may include (i) a respective set of information for each object detected in the vehicle's surrounding, such as a class label, a bounding box, and/or state information for each detected object, (ii) a set of information for vehicle 510 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 510 may incorporate other types of information about the surrounding environment perceived by vehicle 510 as well.

Still further, the derived representation of the surrounding environment perceived by vehicle 510 may be embodied in various forms. For instance, as one possibility, the derived representation of the surrounding environment perceived by vehicle 510 may be embodied in the form of a data structure that represents the surrounding environment perceived by vehicle 510, which may comprise respective data arrays (e.g., vectors) that contain information about the objects detected in the surrounding environment perceived by vehicle 510, a data array that contains information about vehicle 510, and/or one or more data arrays that contain other semantic information about the surrounding environment. Such a data structure may be referred to as a "parameter-based encoding."

As another possibility, the derived representation of the surrounding environment perceived by vehicle 510 may be embodied in the form of a rasterized image that represents the surrounding environment perceived by vehicle 510 in the form of colored pixels. In this respect, the rasterized image may represent the surrounding environment perceived by vehicle 510 from various different visual perspectives, examples of which may include a "top down" view and a "birds eye" view of the surrounding environment, among other possibilities. Further, in the rasterized image, the objects detected in the surrounding environment of vehicle 510 (and perhaps vehicle 510 itself) could be shown as color-coded bitmasks and/or bounding boxes, among other possibilities.

The derived representation of the surrounding environment perceived by vehicle 510 may be embodied in other forms as well.

As shown, perception subsystem 502a may pass its derived representation of the vehicle's surrounding environment to prediction subsystem 502b. In turn, prediction subsystem 502b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 510 to anticipate how the real-world objects in its surrounding environment are likely to behave in the future and then plan its behavior in a way that accounts for this future behavior.

Prediction subsystem 502b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 502b is configured to predict this type of future state information for a detected object at multiple future times, such a time sequence of future states may collectively define a predicted future trajectory of the detected object. Further, in some embodiments, prediction subsystem 502b could be configured to predict multiple different possibilities of future states for a detected object (e.g., by predicting the 3 most-likely future trajectories of the detected object). Prediction subsystem 502b may be configured to predict other aspects of a detected object's future behavior as well.

In practice, prediction subsystem 502b may predict a future state of an object detected in the vehicle's surrounding environment in various manners, which may depend in part on the type of detected object. For instance, as one possibility, prediction subsystem 502b may predict the future state of a detected object using a data science model that is configured to (i) receive input data that includes one or more derived representations output by perception subsystem 502a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 502, although it is possible that a future-state model could be created by on-board computing system 502 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 502b could predict the future state of a detected object in other manners as well. For instance, for detected objects that have been classified by perception subsystem 502a as belonging to certain classes of static objects (e.g., roads, curbs, lane markings, etc.), which generally do not have the potential to move, prediction subsystem 502b may rely on this classification as a basis for predicting that the future state of the detected object will remain the same at each of the one or more future times (in which case the state-prediction model may not be used for such detected objects). However, it should be understood that detected objects may be classified by perception subsystem 502a as belonging to other classes of static objects that have the potential to change state despite not having the potential to move, in which case prediction subsystem 502b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 510.

After predicting the future state of each object detected in the surrounding environment perceived by vehicle 510 at one or more future times, prediction subsystem 502b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 502b may pass the one or more derived representations of the vehicle's surrounding environment to planning subsystem 502c. In turn, planning subsystem 502c may be configured to use the one or more derived representations of the vehicle's surrounding environment (and perhaps other data) to derive a behavior plan for vehicle 510, which defines the desired driving behavior of vehicle 510 for some future period of time (e.g., the next 5 seconds).

The behavior plan that is derived for vehicle 510 may take various forms. For instance, as one possibility, the derived behavior plan for vehicle 510 may comprise a planned trajectory for vehicle 510 that specifies a planned state of vehicle 510 at each of one or more future times (e.g., each second over the next 5 seconds), where the planned state for each future time may include a planned position of vehicle 510 at the future time, a planned orientation of vehicle 510 at the future time, a planned velocity of vehicle 510 at the future time, and/or a planned acceleration of vehicle 510 (whether positive or negative) at the future time, among other possible types of state information. As another possibility, the derived behavior plan for vehicle 510 may comprise one or more planned actions that are to be performed by vehicle 510 during the future window of time, where each planned action is defined in terms of the type of action to be performed by vehicle 510 and a time and/or location at which vehicle 510 is to perform the action, among other possibilities. The derived behavior plan for vehicle 510 may define other planned aspects of the vehicle's behavior as well.

Further, in practice, planning subsystem 502c may derive the behavior plan for vehicle 510 in various manners. For instance, as one possibility, planning subsystem 502c may be configured to derive the behavior plan for vehicle 510 by (i) deriving a plurality of different "candidate" behavior plans for vehicle 510 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 510. Planning subsystem 502c may derive the behavior plan for vehicle 510 in various other manners as well.

After deriving the behavior plan for vehicle 510, planning subsystem 502c may pass data indicating the derived behavior plan to control subsystem 502d. In turn, control subsystem 502d may be configured to transform the behavior plan for vehicle 510 into one or more control signals (e.g., a set of one or more command messages) for causing vehicle 510 to execute the behavior plan. For instance, based on the behavior plan for vehicle 510, control subsystem 502d may be configured to generate control signals for causing vehicle 510 to adjust its steering in a specified manner, accelerate in a specified manner, and/or brake in a specified manner, among other possibilities.

As shown, control subsystem 502d may then pass the one or more control signals for causing vehicle 510 to execute the behavior plan to vehicle-interface subsystem 502e. In turn, vehicle-interface subsystem 502e may be configured to translate the one or more control signals into a format that can be interpreted and executed by components of vehicle-control system 503. For example, vehicle-interface subsystem 502e may be configured to translate the one or more control signals into one or more control messages are defined according to a particular format or standard, such as a CAN bus standard and/or some other format or standard that is used by components of vehicle-control system 503.

In turn, vehicle-interface subsystem 502e may be configured to direct the one or more control signals to the appropriate control components of vehicle-control system 503. For instance, as shown, vehicle-control system 503 may include a plurality of actuators that are each configured to control a respective aspect of the vehicle's physical operation, such as a steering actuator 503a that is configured to control the vehicle components responsible for steering (not shown), an acceleration actuator 503b that is configured to control the vehicle components responsible for acceleration such as a throttle (not shown), and a braking actuator 503c that is configured to control the vehicle components responsible for braking (not shown), among other possibilities. In such an arrangement, vehicle-interface subsystem 502e of on-board computing system 502 may be configured to direct steering-related control signals to steering actuator 503a, acceleration-related control signals to acceleration actuator 503b, and braking-related control signals to braking actuator 503c. However, it should be understood that the control components of vehicle-control system 503 may take various other forms as well.

Notably, the subsystems of on-board computing system 502 may be configured to perform the above functions in a repeated manner, such as many times per second, which may enable vehicle 510 to continually update both its understanding of the surrounding environment and its planned behavior within that surrounding environment.

Although not specifically shown, it should be understood that vehicle 510 includes various other systems and components as well, including but not limited to a propulsion system that is responsible for creating the force that leads to the physical movement of vehicle 510.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
   identifying a set of prior vehicle trajectories for vehicles that have previously traveled through a path within a real-world area;
   identifying a sequence of contiguous segments that represent the path, wherein each respective pair of two consecutive segments in the sequence defines a respective segment border that extends across the path;
   for each respective segment border of two or more segment borders that extend across the path, (i) determining a respective set of multiple intersection points between the identified set of prior vehicle trajectories and the respective segment border that extends across the path;
   and (ii) generating a respective per-segment-border aggregation of the respective set of multiple intersection points for the respective segment border; and
   based on the generated respective per-segment-border aggregations for the two or more segment borders along the path, deriving a path-prior dataset for the path wherein the derived path-prior dataset is utilized to control a physical behavior of a vehicle.

2. The computer-implemented method of claim 1, further comprising:
   before identifying the set of prior vehicle trajectories traveled through the path within the real-world area, (i) obtaining sensor data captured by one or more sensor-equipped vehicles while traveling in the real-world area, and (ii) generating a plurality of prior vehicle trajectories from the sensor data that was captured, and
   wherein identifying the set of prior vehicle trajectories traveled through the path within the real-world area comprises identifying the set of prior vehicle trajectories from the generated plurality of prior vehicle trajectories.

3. The computer-implemented method of claim 2, wherein the path within the real-world area comprises a given lane within the real-world area, and wherein identifying the set of prior vehicle trajectories from the generated plurality of prior vehicle trajectories traveled through the given lane comprises (i) accessing map data that defines geospatial information for the given lane within the area, (ii) comparing the map data that defines the geospatial information for the given lane to the generated plurality of prior vehicle trajectories, and (iii) based on this comparing, identifying the set of prior vehicle trajectories to include one or more of the generated plurality of prior vehicle trajectories that have traversed the given lane.

4. The computer-implemented method of claim 2, wherein the sensor data captured by the one or more sensor-equipped vehicles while operating in the real-world area comprises one or more of image data, Inertial Measurement Unit (IMU) data, or Global Positioning System (GPS) data.

5. The computer-implemented method of claim 1, wherein identifying the sequence of contiguous segments that represent the path comprises:
- determining a number of desired contiguous segments to represent the path;
- dividing the path by the number of desired contiguous segments; and
- identifying pairs of segment points at each respective segment border within the path.

6. The computer-implemented method of claim 1, wherein generating the respective per-segment-border aggregation of the respective set of multiple intersection points for each respective segment border of the two or more segment borders along the path comprises:
- for each respective segment border of the two or more segment borders along the path, aggregating the respective set of multiple intersection points together to produce a per-segment-border aggregated intersection point for the respective segment border.

7. The computer-implemented method of claim 6, wherein deriving the path-prior dataset for the path comprises:
- inputting the respective per-segment-border aggregated intersection points produced for the two or more segment borders into a motion model that functions to output a smoothed version of the respective per-segment-border aggregated intersection points; and
- defining the output of the motion model as the path-prior dataset for the path.

8. The computer-implemented method of claim 6, wherein deriving the path-prior dataset for the path comprises:
- compiling the respective per-segment-border aggregated intersection points produced for the two or more segment borders into a set of per-segment-border aggregated intersection points that defines the path-prior dataset for the path.

9. The computer-implemented method of claim 1, wherein generating the respective per-segment-border aggregation of the respective set of multiple intersection points for each respective segment border of the two or more segment borders along the path comprises:
- for each respective segment border of the two or more segment borders along the path, generating a respective per-segment-border distribution that is representative of the respective set of multiple intersection points for the respective segment border.

10. The computer-implemented method of claim 9, wherein deriving the path-prior dataset for the path comprises encoding the per-segment-border distributions for the two or more segment borders into the path-prior dataset for the path.

11. The computer-implemented method of claim 1, wherein generating the respective per-segment-border aggregation of the respective set of multiple intersection points for each respective segment border of the two or more segment borders along the path comprises:
- for each respective segment border of the two or more segment borders along the path, (i) generating a weighted version of the respective set of multiple intersection points for the respective segment border by applying a per-point weight to each intersection point in the respective set of multiple intersection points, wherein the applied per-point weight is based on a distance of each intersection point to a reference point along the respective segment border, and (ii) using the weighted version of the respective set of multiple intersection points for the respective segment border to generate the respective per-segment-border aggregation of the respective set of multiple intersection points for the respective segment border.

12. The computer-implemented method of claim 1, wherein generating the respective per-segment-border aggregation of the respective set of multiple intersection points for each respective segment border of the two or more segment borders along the path comprises:
- for each respective segment border of the two or more segment borders along the path, ignoring any point in the respective set of multiple intersection points that is outside a boundary of the path.

13. The computer-implemented method of claim 1, wherein the derived path-prior dataset for the path is thereafter utilized by a computing platform that is configured to perform transportation-matching functionality.

14. The computer-implemented method of claim 1, wherein the derived path-prior dataset is thereafter utilized to predict vehicle behavior.

15. A non-transitory computer-readable medium comprising executable program instructions for:
- identifying a set of prior vehicle trajectories traveled through a path within a real-world area;
- identifying a sequence of contiguous segments that represent the path, wherein each respective pair of two consecutive segments in the sequence defines a respective segment border that extends across the path;
- for each respective segment border of two or more segment borders that extend across the path, (i) determining a respective set of multiple intersection points between the identified set of prior vehicle trajectories and the respective segment border that extends across the path; and
- (ii) generating a respective per-segment-border aggregation of the respective set of multiple intersection points for the respective segment border; and
- based on the respective per-segment-border aggregations for the two or more segment borders along the path, deriving a path-prior dataset for the path wherein the derived path-prior dataset is utilized to control a physical behavior of a vehicle.

16. The computer-readable medium of claim 15, further comprising executable program instructions for:
- before identifying the set of prior vehicle trajectories traveled through the path within the real-world area, (i) obtaining sensor data captured by one or more sensor-equipped vehicles while traveling in the real-world area, and (ii) generating a plurality of prior vehicle trajectories from the sensor data that was captured, and
- wherein identifying the set of prior vehicle trajectories traveled through the path within the real-world area comprises identifying the set of prior vehicle trajectories from the generated plurality of prior vehicle trajectories.

17. The computer-readable medium of claim 16, wherein the path within the real-world area comprises a given lane within the real-world area, and wherein identifying the set of prior vehicle trajectories from the generated plurality of prior vehicle trajectories traveled through the given lane comprises (i) accessing map data that defines geospatial information for the given lane within the area, (ii) comparing the map data that defines the geospatial information for the given lane to the generated plurality of prior vehicle trajectories, and (iii) based on this comparing, identifying the set of prior vehicle trajectories to include one or more of the generated plurality of prior vehicle trajectories that have traversed the given lane.

18. A computing system comprising:
   at least one processor;
   at least one non-transitory computer-readable medium;
   and program instructions stored on the at least one non-transitory computer-readable medium that are executable by the at least one processor such that the computing system is capable of:
   identifying set of prior vehicle trajectories traveled through a path within a real-world area;
   identifying a sequence of contiguous segments that represent the path, wherein each respective pair of two consecutive segments in the sequence defines a respective segment border that extends across the path;
   for each respective segment border of two or more segment borders that extend across the path, (i) determining a respective set of multiple intersection points between the identified set of prior vehicle trajectories and the respective segment border that extends across the path; and
   (ii) generating a respective per-segment-border aggregation of the respective set of multiple intersection points for the respective segment border; and
   based on the respective per-segment-border aggregations for the two or more segment borders along the path, deriving a path-prior dataset for the path wherein the derived path-prior dataset is utilized to control a physical behavior of a vehicle.

19. The computing system of claim 18, further comprising program instructions stored on the non-transitory computer-readable medium that are executable such that the computing system is capable of:
   before identifying the set of prior vehicle trajectories traveled through the path within the real-world area, (i) obtaining sensor data captured by one or more sensor-equipped vehicles while traveling in the real-world area, and (ii) generating a plurality of prior vehicle trajectories from the sensor data that was captured, and
   wherein identifying the set of prior vehicle trajectories traveled through the path within the real-world area comprises identifying the set of prior vehicle trajectories from the generated plurality of prior vehicle trajectories.

20. The computing system of claim 19, wherein the path within the real-world area comprises a given lane within the real-world area, and wherein identifying the set of prior vehicle trajectories from the generated plurality of prior vehicle trajectories traveled through the given lane comprises (i) accessing map data that defines geospatial information for the given lane within the area, (ii) comparing the map data that defines the geospatial information for the given lane to the generated plurality of prior vehicle trajectories, and (iii) based on this comparing, identifying the set of prior vehicle trajectories to include one or more of the generated plurality of prior vehicle trajectories that have traversed the given lane.

* * * * *